US012763267B2

(12) United States Patent
Panat et al.

(10) Patent No.: US 12,763,267 B2
(45) Date of Patent: Oct. 13, 2026

(54) 3D-PRINTED MICRO-SUPERCAPACITORS AND METHODS FOR FABRICATING THE SAME

(71) Applicant: Carnegie Mellon University, Pittsburgh, PA (US)

(72) Inventors: Rahul Panat, Pittsburgh, PA (US); Bin Yuan, Pittsburgh, PA (US); Chunshan Hu, Pittsburgh, PA (US); Azahar Ali, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 167 days.

(21) Appl. No.: 18/707,959

(22) PCT Filed: Nov. 15, 2022

(86) PCT No.: PCT/US2022/079851
§ 371 (c)(1),
(2) Date: May 7, 2024

(87) PCT Pub. No.: WO2023/091902
PCT Pub. Date: May 25, 2023

(65) Prior Publication Data

US 2025/0364189 A1 Nov. 27, 2025

Related U.S. Application Data

(60) Provisional application No. 63/279,241, filed on Nov. 15, 2021.

(51) Int. Cl.
*H01G 11/38* (2013.01)
*H01G 11/24* (2013.01)
(Continued)

(52) U.S. Cl.
CPC ............ *H01G 11/38* (2013.01); *H01G 11/24* (2013.01); *H01G 11/26* (2013.01); *H01G 11/36* (2013.01); *H01G 11/84* (2013.01)

(58) Field of Classification Search
None
See application file for complete search history.

(56) References Cited

U.S. PATENT DOCUMENTS 6,785,118 B1 8/2004 Liu et al.
2007/0126079 A1* 6/2007 Shioya .................. H10B 12/03 257/E27.113

(Continued)

FOREIGN PATENT DOCUMENTS

KR 20190013359 A * 2/2019 ............ H01G 11/32

OTHER PUBLICATIONS

Patent Cooperation Treaty, PCT/US2022/79851, International Search Report, Aug. 10, 2023.

*Primary Examiner* — Eric W Thomas
(74) *Attorney, Agent, or Firm* — Jones Day

(57) ABSTRACT

Three-dimensional micro-supercapacitors and methods for fabrication of micro-supercapacitors are provided. A micro-supercapacitor embodiment includes a three-dimensional electrode with self-supporting layers of two-dimensional nanomaterial. A method embodiment includes using non-contact 3D printing to generate a micro-supercapacitor, including a three-dimensional electrode having self-supporting two-dimensional nanomaterial.

26 Claims, 72 Drawing Sheets

(51) Int. Cl.

| | |
|---|---|
| ***H01G 11/26*** | (2013.01) |
| ***H01G 11/36*** | (2013.01) |
| *H01G 11/84* | (2013.01) |

(56) References Cited

U.S. PATENT DOCUMENTS

| | | | | |
|---|---|---|---|---|
| 2012/0107668 | A1 | 5/2012 | Ling et al. | |
| 2012/0127630 | A1* | 5/2012 | Lin .......................... | H01G 4/06<br>977/890 |
| 2012/0170171 | A1* | 7/2012 | Lee ........................ | H01G 11/86<br>174/254 |
| 2013/0083452 | A1 | 4/2013 | Chiu et al. | |
| 2015/0197063 | A1 | 7/2015 | Shinar et al. | |
| 2016/0126558 | A1 | 5/2016 | Lewis et al. | |
| 2017/0154737 | A1 | 6/2017 | Zhi et al. | |
| 2019/0333716 | A1 | 10/2019 | Yoo et al. | |
| 2021/0115284 | A1 | 4/2021 | Beidaghi et al. | |

* cited by examiner

102

3D-PRINTED MICRO-SUPERCAPACITORS AND METHODS FOR FABRICATING THE SAME

CROSS-REFERENCE TO RELATED APPLICATIONS

This application is a U.S. National Stage Application under 35 U.S.C. § 371 of International Patent Application No. PCT/US2022/079851, filed Nov. 15, 2022, which claims priority to U.S. Provisional Patent Application No. 63/279,241, filed on Nov. 15, 2021, both of which are incorporated herein by reference in their entireties.

BACKGROUND

Micro-supercapacitors are often used as miniaturized energy storage devices. Due to their relatively high power density and long cycle life, micro-supercapacitors are commonly used in aerospace and automotive applications, portable electronic devices, and miniature biomedical equipment, among other areas.

BRIEF DESCRIPTION OF THE DRAWINGS

Aspects of the present disclosure are best understood from the following detailed description when read with the accompanying figures. It should be noted that, in accordance with the standard practice of the industry, various features are not drawn to scale. In fact, the dimensions of various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1A:
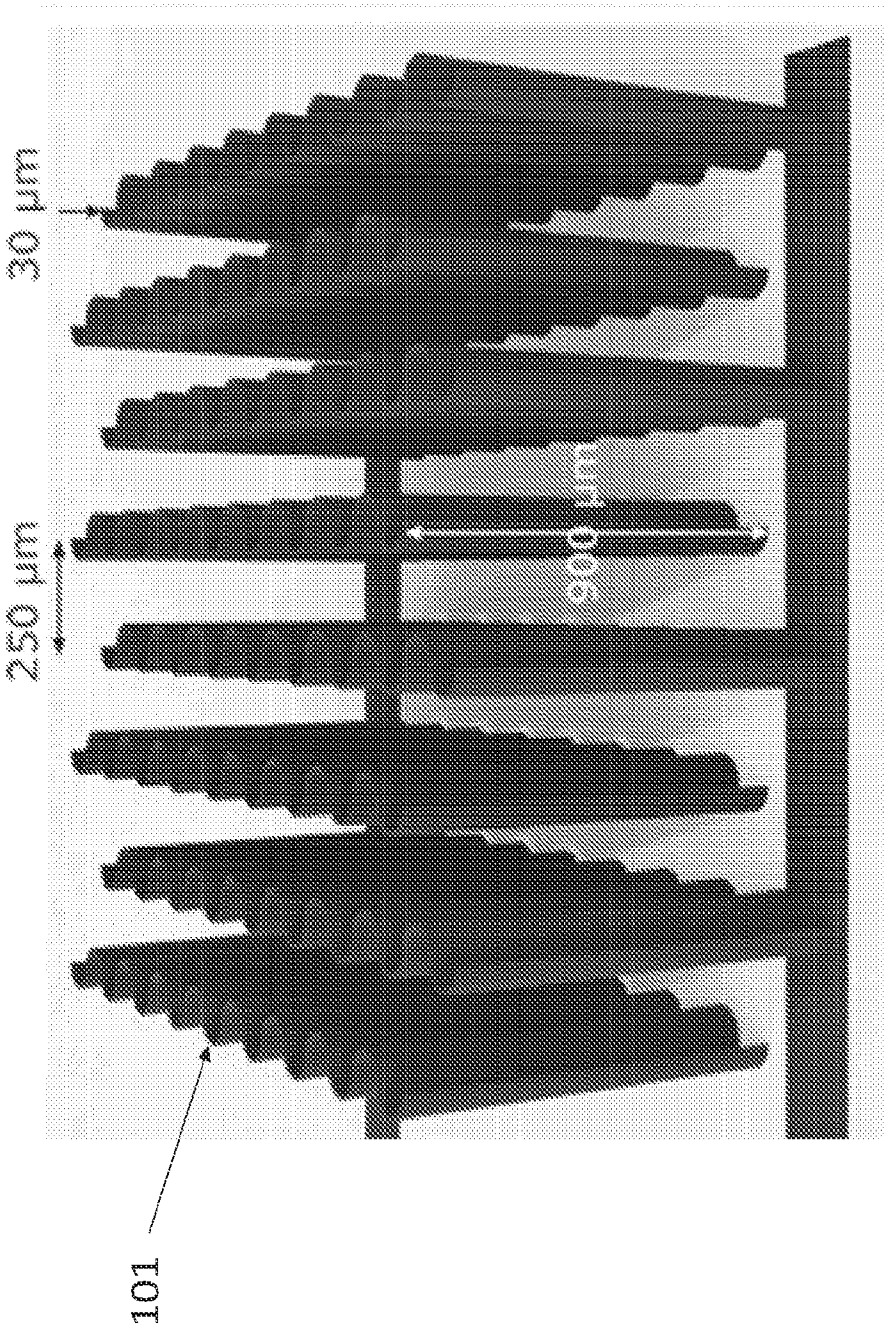
FIG. 1*a* and FIG. 1*b* are schematic diagrams of a three-dimensional (3D) micro-supercapacitor, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

In addition, it is to be understood that the phraseology and terminology employed herein are for the purpose of description and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one having ordinary skill in the art upon examination of the detailed description. It is intended that such additional systems, methods, features, and advantages be included within this description, be within the scope of the present invention, and be protected by the accompanying claims.

Some embodiments of the disclosure are described. Additional operations can be provided before, during, and/or after the stages described in these embodiments. Some of the stages that are described can be replaced or eliminated for different embodiments. Additional features can be added to the micro-supercapacitor. Some of the features described below can be replaced or eliminated for different embodiments. Although some embodiments are discussed with operations performed in a particular order, these operations may be performed in another logical order.

Energy storage devices play an important role in the modern world as technology grows at an exponential rate. Micro-supercapacitors are energy storage devices capable of providing higher energy and higher power densities than conventional energy storage devices (e.g., capacitors) and thus have applications in a variety of different devices and fields (e.g., telecommunications, aerospace and automotive applications, portable electronic devices, and miniature biomedical equipment).

Micro-supercapacitors are conventionally fabricated as planar 2D structures with minimum feature sizes of around 80 micrometers (μm). The 2D structures and relatively large features of the conventional micro-supercapacitors limit their areal capacitance and areal output voltages. As detailed below, the present inventors have developed structures and fabrication methods that significantly enhance the performance of micro-supercapacitors by increasing their areal capacitance and areal output voltages as compared to the conventional approaches. Further, the present inventors have recognized that controlled assembly of 2D nanomaterials into well-defined, high-resolution 3D microarchitectures can be utilized to provide high-performance micro-supercapacitors.

Conventional manufacturing techniques for micro-supercapacitors (e.g., self-assembly, plasma etching, and contact-based printing techniques) are capable of creating only planar structures with low-aspect ratios and/or low-resolution features. Further, conventional techniques for self-assembling 2D materials typically require the use of additives, which is undesirable. Other conventional fabrication methods for micro-supercapacitors (e.g., subtractive manufacturing methods, such as plasma etching) likewise generally result in planar architectures. As another example of the conventional fabrication techniques, extrusion printing can create structures of coarse resolutions and is subject to other limitations (e.g., template fabrication and removal and shrinkage). The present inventors have recognized that the conventional techniques for fabricating micro-supercapacitors cannot provide characteristics (e.g., small feature sizes, high aspect ratios) desirable for achieving high performance.

To address the problems of the conventional techniques, the present disclosure utilizes non-contact 3D printing techniques (e.g., aerosol jet 3D printing) for fabricating 3D micro-supercapacitors with high-resolution features and high aspect ratios. These 3D micro-supercapacitors, which are assembled by stacking layers of 2D nanomaterials and/or layers of nanoparticle materials in a vertical direction, can include overhang structures without auxiliary support structures. The non-contact 3D printing techniques disclosed herein provide the ability to print such overhang structures (as well as other non-overhang structures) with minimal feature sizes and thus enable higher resolution and higher aspect ratio structures with no observable shrinkage post-printing. Further, the non-contact 3D printing techniques disclosed herein advantageously enable the creation of complex structures that conventional methods cannot achieve.

As detailed below, the approaches of the present disclosure provide 3D micro-supercapacitors and methods for fabricating 3D micro-supercapacitors that enable higher performance than the conventional micro-supercapacitors described above. These micro-supercapacitors advantageously exhibit high areal density and high areal output voltage. In accordance with the approaches described herein, the planar electrodes of the conventional approaches are replaced with complex 3D electrodes having high resolution features (e.g., features at a resolution of micron length scale).

In some embodiments, the 3D micro-supercapacitors described herein increase areal loading of active electrode material through the use of non-contact 3D printing capable of generating high-resolution features (e.g., features having sizes on the order of 10 μm), leading to high areal capacitance and high areal voltage. In some embodiments, the micro-supercapacitors include electrodes with aspect ratios as high as 30:1, and the distance between the electrodes can be as low as 10 μm, creating an ultrahigh areal capacitance in excess of 370 $mF\cdot cm^{-2}$ and 130 $V\cdot cm^{-2}$ using high performance active electrode material such as $Ti_3C_2$ MXene. In some embodiments, the method of fabrication is aerosol jet 3D printing, which creates 3D architectures with self-supporting structures having no additives. These structures and their associated fabrication methods are described in detail below.

Figure 1B:
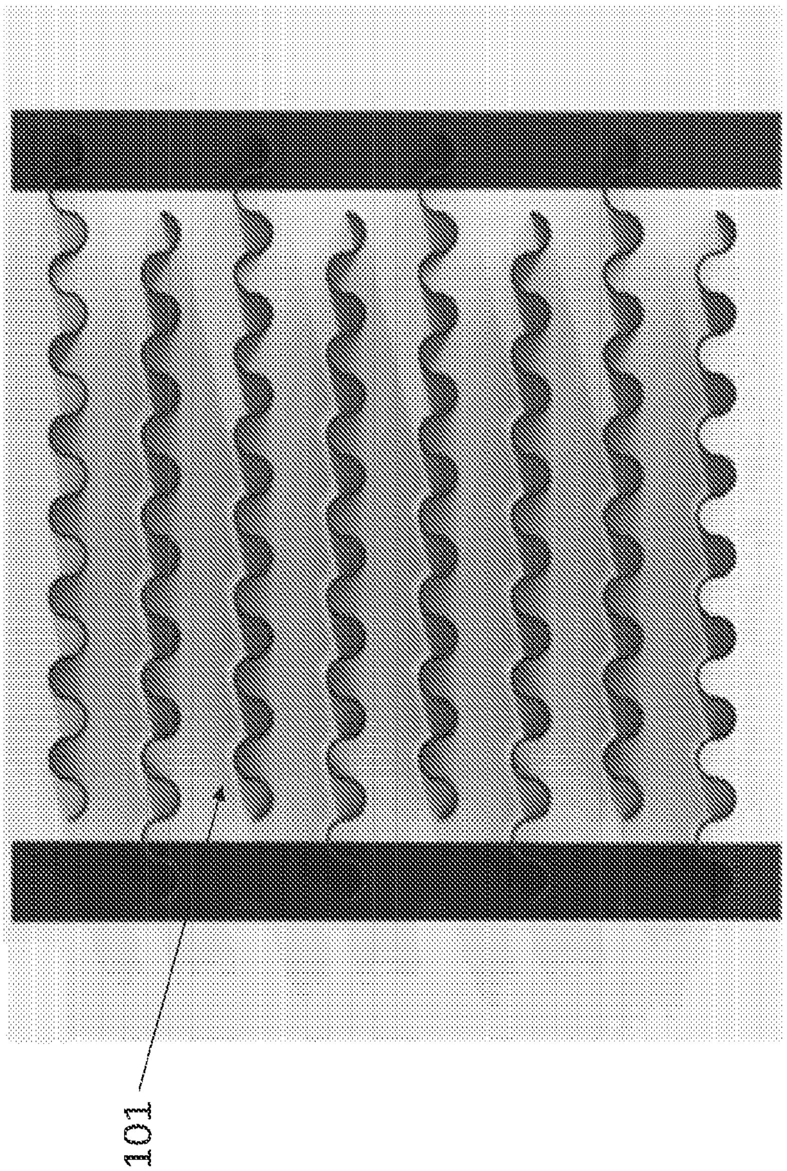

FIG. 1*a* and FIG. 1*b* are schematics of a 3D interdigitated $Ti_3C_2$ MXene micro-supercapacitor, in accordance with some embodiments. The micro-supercapacitors of these figures include a plurality of electrodes 101 that extend from a substrate in a vertical direction (e.g., the z direction). In embodiments, the micro-supercapacitors of these figures further include a base layer (e.g., the substrate or a layer formed over the substrate) that electrically connects the plurality of electrodes 101. The electrodes 101 are spaced apart from each other by a distance that is between 2 μm and 250 μm.

In some embodiments, the electrodes 101 are made of self-supporting layers of 2D nanomaterials (e.g., 2D nanosheets) assembled in the vertical direction, where the plurality of self-supporting layers define one or more shapes in planes that are at arbitrary angles to the vertical direction. FIG. 1*b*, for example, depicts a plane that is perpendicular to the vertical direction and shows that the micro-supercapacitors form wavy shapes in this plane. Rotating the perpendicular plane shown in FIG. 1*b* would result in a different plane at an arbitrary angle to the vertical direction, and this alternative plane would likewise have a variety of shapes defined by the electrodes 101. 2D nanosheets, such as those used in constructing the micro-supercapacitors of FIGS. 1*a* and 1*b*, have advantageous properties including high specific surface area and mechanical strength, unique optical electrochemical and catalytical properties, and tunable surface chemistry.

In embodiments, the electrodes 101 of the micro-supercapacitor have relatively small feature sizes and high aspect ratios. In FIGS. 1*a* and 1*b*, for example, the wavy shapes defined in the plane that is perpendicular to the vertical direction have feature sizes on the order of 20 μm. In embodiments, the minimum feature size of the one or more shapes in the plane perpendicular to the vertical direction (or another plane at an arbitrary angle to the vertical direction) is between 5 μm and 50 μm. Further, as seen in FIGS. 1*a* and 1*b*, the electrodes 101 have a height in the vertical direction of 900 μm, thus providing an aspect ratio of 30:1 in accordance with some embodiments. Aspect ratio, as referred to herein, is the ratio of the structure's height in the vertical direction (i.e., 900 μm in the example of FIGS. 1*a* and 1*b*) to the structure's feature sizes in the x-y plane (i.e., 30 μm in the example of FIGS. 1*a* and 1*b*). The dimensions depicted in FIGS. 1*a* and 1*b* are merely examples, and other embodiments use other dimensions. For instance, further increasing the plane height and decreasing the pitch would increase the areal capacitance. Alternatively, decreasing the pitch would facilitate the ion transportation and, therefore, the rate performance of the micro-supercapacitor.

In some embodiments, the height in the vertical direction is at least five times greater than the minimum feature size of the one or more shapes in the x-y plane. The high aspect ratio 3D structures of the present disclosure enable greater surface area and increased areal material loading than the conventional approaches, thus enabling enhanced micro-supercapacitor performance. In embodiments of the present disclosure, the electrode architecture consists of wavy microwalls of 2D materials such as MXene to yield ultra-high areal capacitance. To increase the areal capacitance, in some embodiments, conventional in-plane interdigitated configurations are replaced with 3D interdigitated configurations having wavy microwalls, such as shown in FIGS. 1*a* and 1*b*.

Figure 1C:
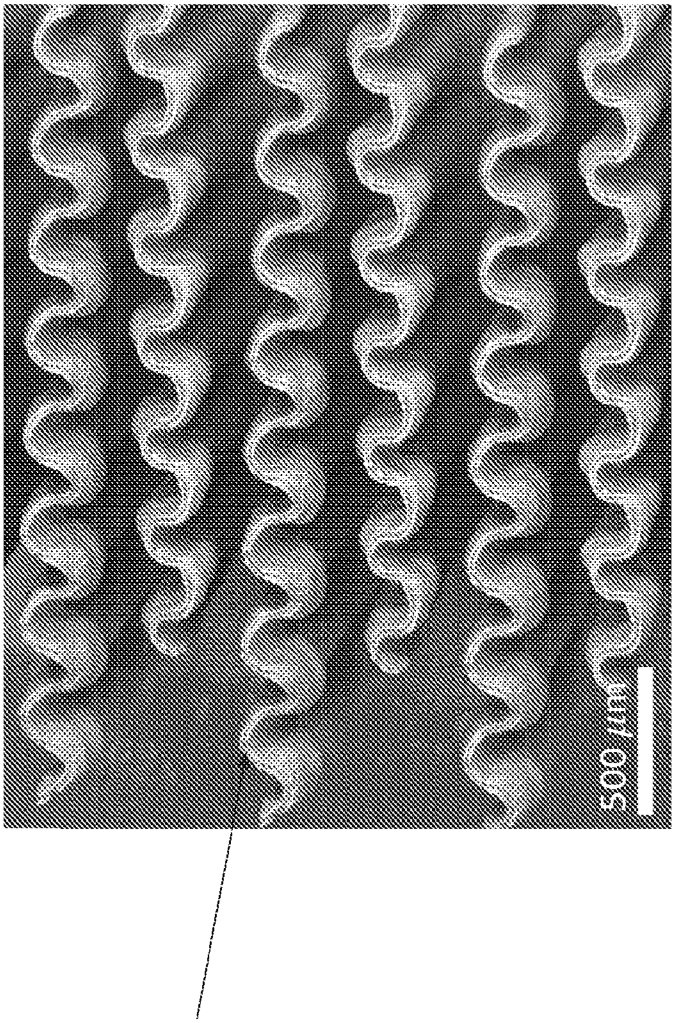
FIG. 1*c* and FIG. 1*d* are scanning electron microscope (SEM) images of a 3D micro-supercapacitor, in accordance with some embodiments.
Figure 1D:
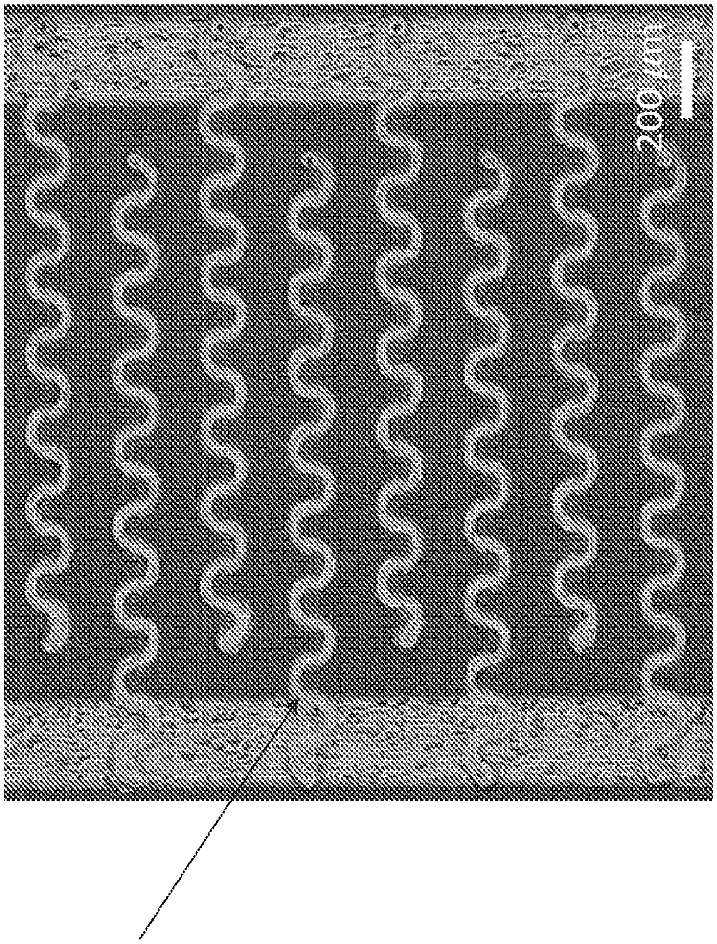

FIGS. 1*c* and 1*d* are SEM images of a 3D interdigitated MXene micro-supercapacitor printed using an aerosol jet 3D printing technique, in accordance with some embodiments. In these embodiments, electrodes 102 are made of active electrode material and do not include current collector material. As $Ti_3C_2$ MXene is highly conductive, no current collector is needed in this device design, which simplifies the device fabrication and lowers its cost. In some embodiments, the 2D nanomaterial used in constructing the electrodes 102 is additive-free $Ti_3C_2$ MXene nanosheets. The additive-free $Ti_3C_2$ MXene nanosheets of these embodiments do not include binders, and the nanosheets are assembled into 3D structures via non-contact 3D printing techniques, as described below.

Figure 2A:
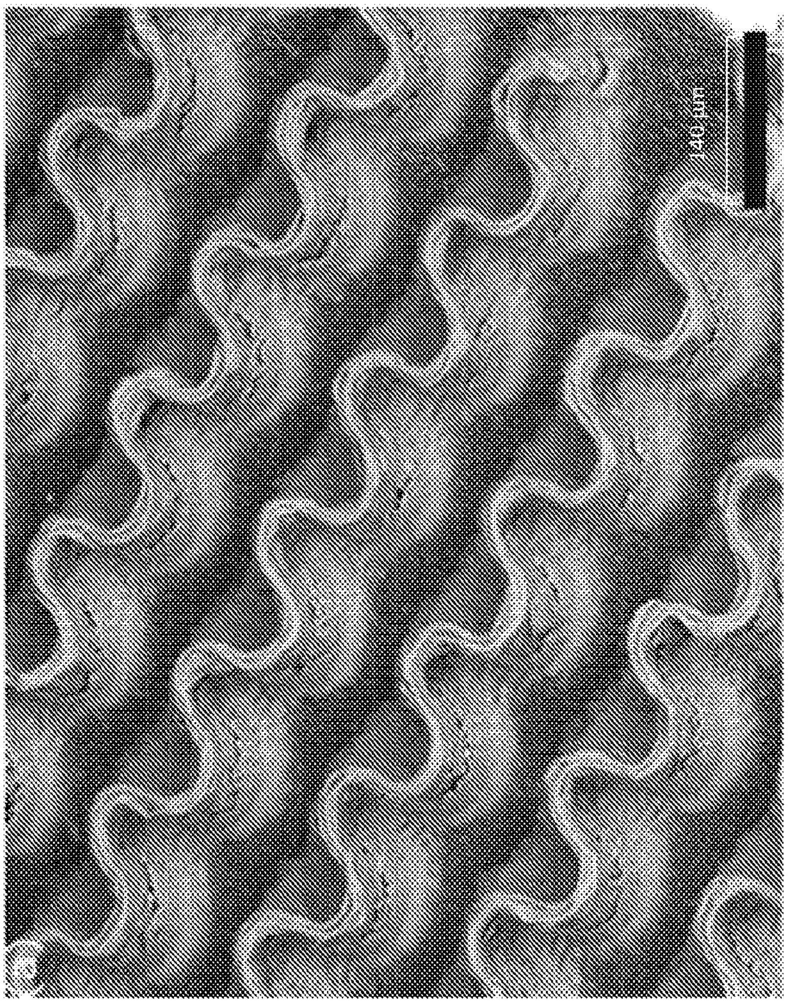
FIG. 2*a* is an SEM image of a printed wavy interdigitated electrode, in accordance with some embodiments.
Figure 2B:
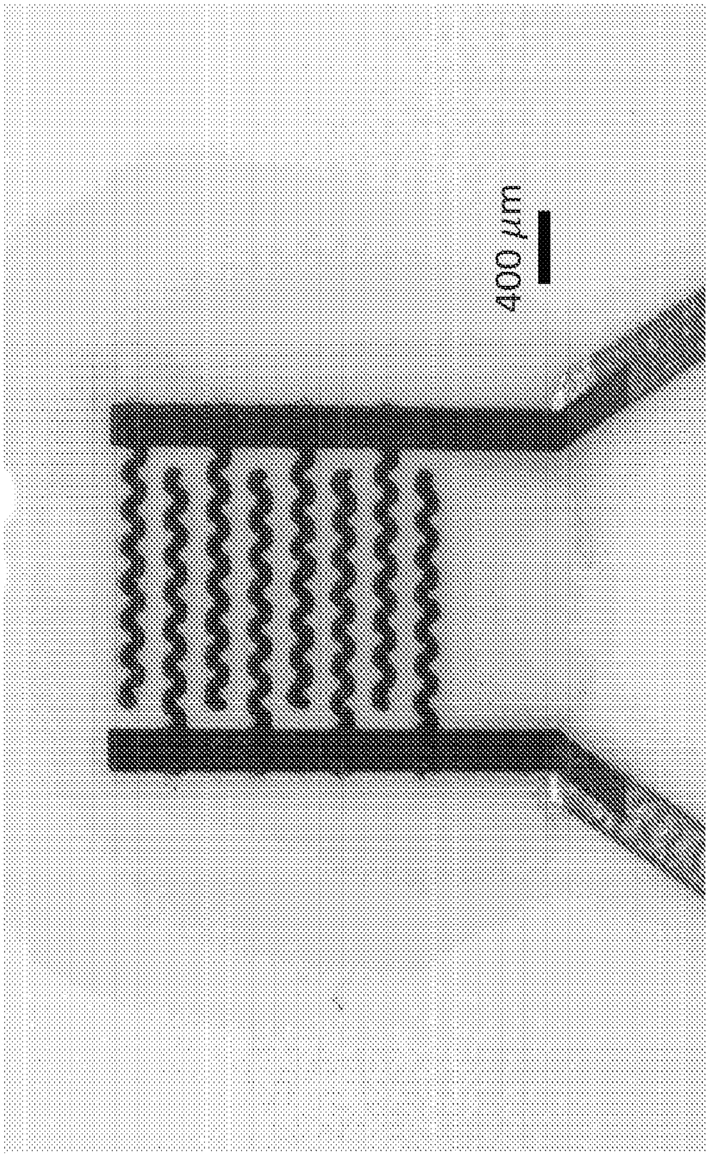
FIG. 2*b* is an optical image of a 3D micro-supercapacitor, in accordance with some embodiments.

FIG. 2*a* is an SEM image of 3D-printed wavy interdigitated MXene electrodes, in accordance with some embodiments. FIG. 2*b* is an optical image of the MXene micro-supercapacitor with electrolyte and wires added, in accordance with some embodiments. In embodiments of the present disclosure, a gel electrolyte (3 M sulfuric acid-poly (vinyl alcohol)) is dropcasted on to the printed 3D interdigitated electrodes. Other possible electrolytes include, but are not limited to, other acidic/neutral/basic aqueous electrolytes, organic electrolytes, and ionic liquid electrolytes.

Figure 2C:
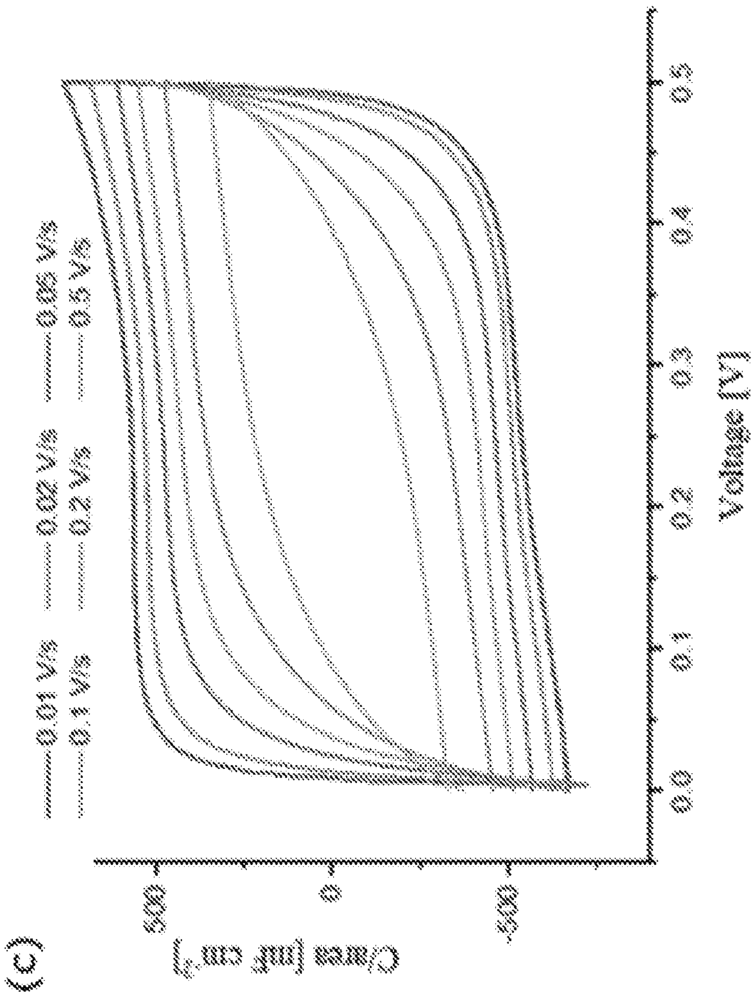
FIG. 2*c* is a graph of normalized cyclic voltammetry profiles of the embodiment in FIG. 2*b*.
Figure 2D:
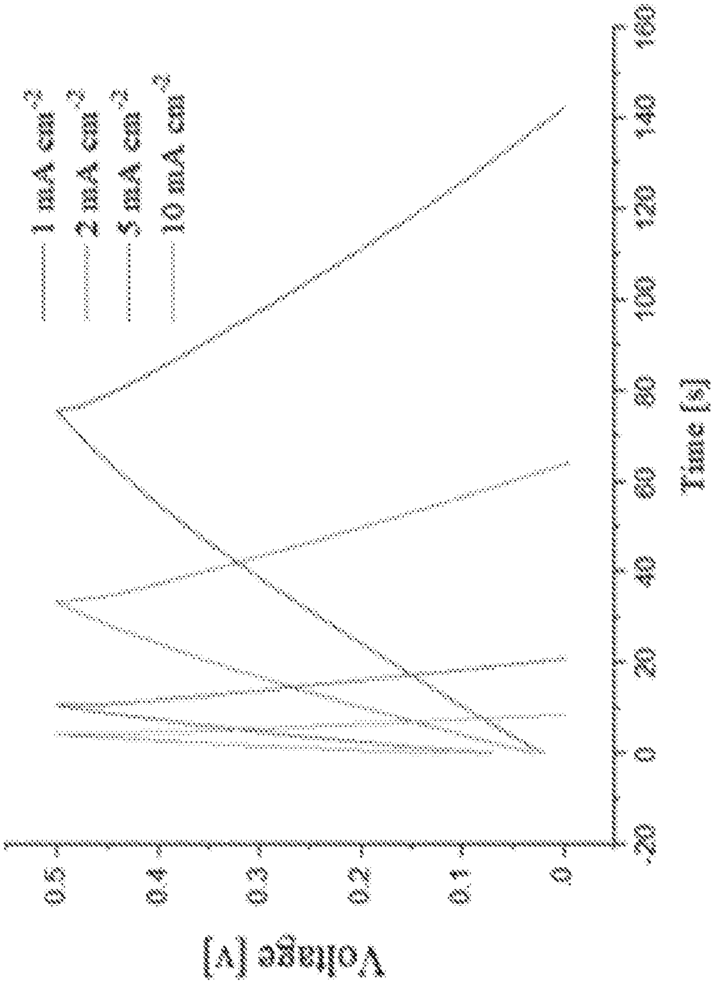
FIG. 2*d* is a graph of galvanostatic charge/discharge curves of the embodiment in FIG. 2*b*.

FIG. 2*c* is a graph of normalized cyclic voltammetry profiles of the micro-supercapacitor of FIG. 2*b*, and FIG. 2*d* is a graph of galvanostatic charge-discharge curves of the micro-supercapacitor of FIG. 2*b*, in accordance with embodiments. The rectangular shape of the cyclic voltammetry curve suggests that the charge storage mechanism of the $Ti_3C_2$ MXene is due to its capacitive property, as shown in FIG. 2*c*. This is confirmed by the triangular shape of the galvanostatic charge-discharge curve shown in FIG. 2*d*.

In some embodiments, as seen in FIG. 1*a* and FIG. 1*b*, a thin layer of $Ti_3C_2$ MXene overspray (e.g., an overspray of 80 μm thickness) formed on the substrate shorts the electrodes together. The electrodes can be readily isolated using focused ion beam (FIB) during the post-printing processing, in accordance with some embodiments.

Figure 3:
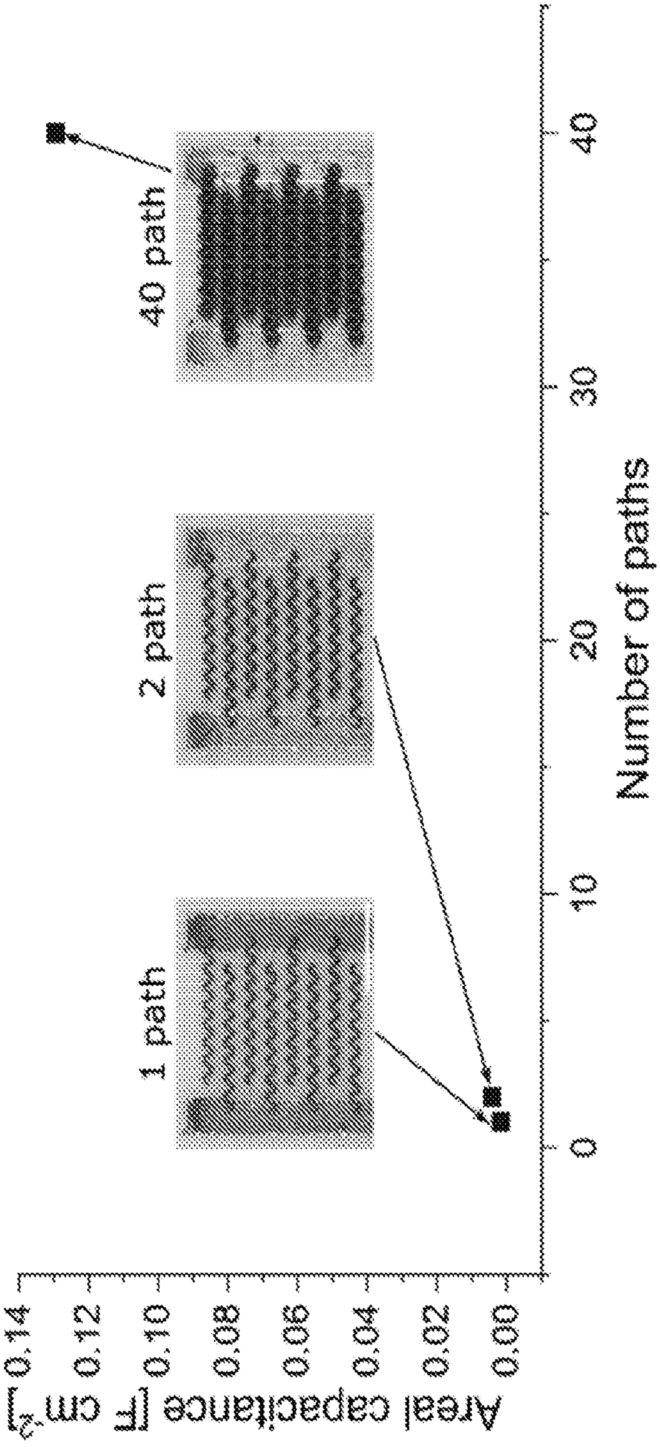
FIG. 3 is a graph depicting the areal capacitance of various embodiments based on a number of paths of each micro-supercapacitor.

FIG. 3 is a graph depicting the relationship between device areal capacitance and the number of 3D printing paths, in accordance with some embodiments. The areal capacitance increases as the heights of the electrodes increase, as shown in FIG. 3. In embodiments, the areal capacitance of the device is 0.129 $F \cdot cm^{-2}$ for a micro-supercapacitor that is created with forty (40) 3D printing passes. This is contrasted with other embodiments created with one and two printing passes, which have areal capacitances of less than 0.01 $F \cdot cm^{-2}$. The areal capacitance of a micro-supercapacitor with 40 printing passes is more than one order of magnitude higher than a device that was fabricated using a planar printing technique that does not result in a 3D structure.

Figure 4:
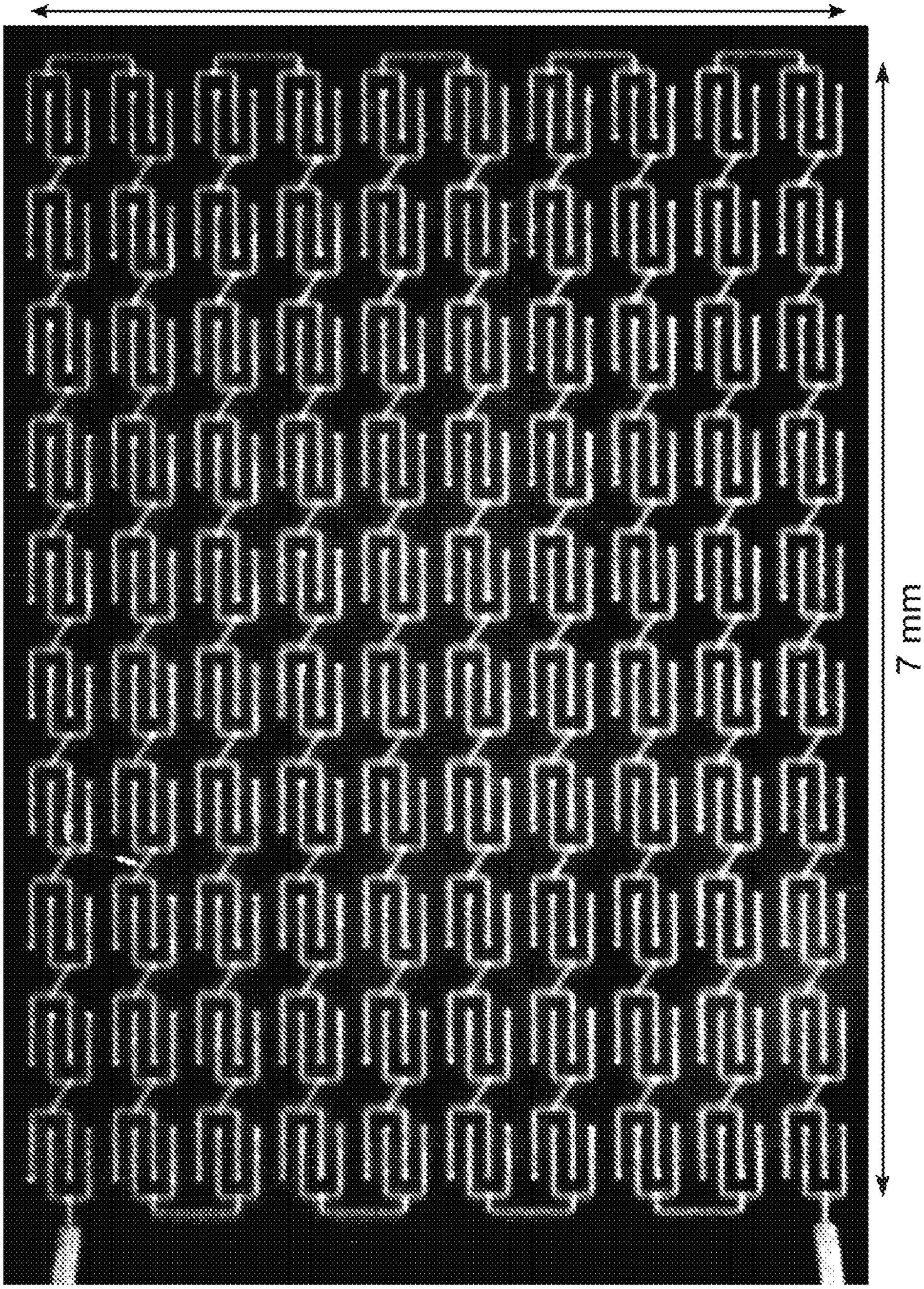
FIG. 4 is an optical image depicting 3D micro-supercapacitors in series, in accordance with some embodiments.

FIG. 4 is an image of multiple micro-supercapacitors coupled together in series, in accordance with some embodiments. The coupling of micro-supercapacitors in series can yield areal output voltages on the order of 130 $V \cdot cm^{-2}$ with 0.5 operating voltage window for each device, in accordance with some embodiments, which is about twice the state-of-the-art micro-supercapacitor areal output voltage In embodiments of the present disclosure, the high printing resolution provided by 3D printing allows for the fabrication of micro-supercapacitors with ultra-small sizes of 0.21 $mm^2$. By further decreasing the size of the micro-supercapacitor by using lower electrode distance and fewer electrodes, this areal output voltage density can be further increased.

Figure 5A:
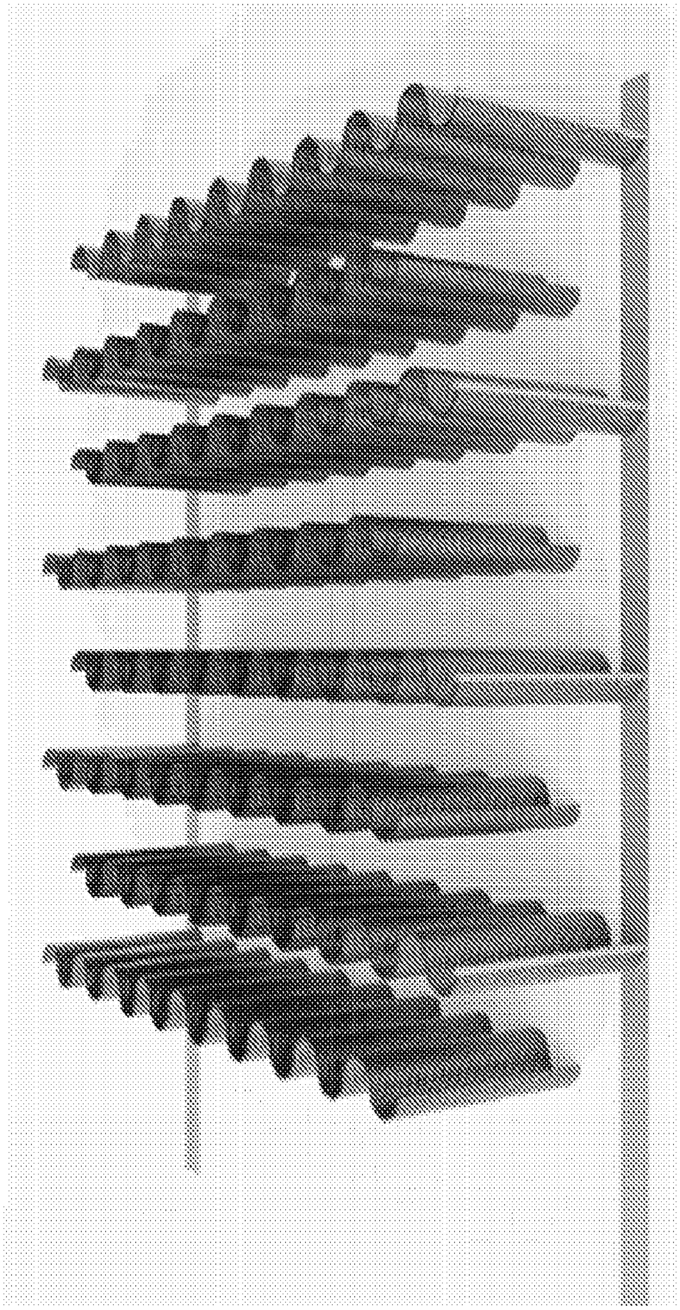
FIG. 5*a* and FIG. 5*b* are schematic diagrams of a 3D micro-supercapacitor with current collector and active electrodes, in accordance with some embodiments.
Figure 5B:
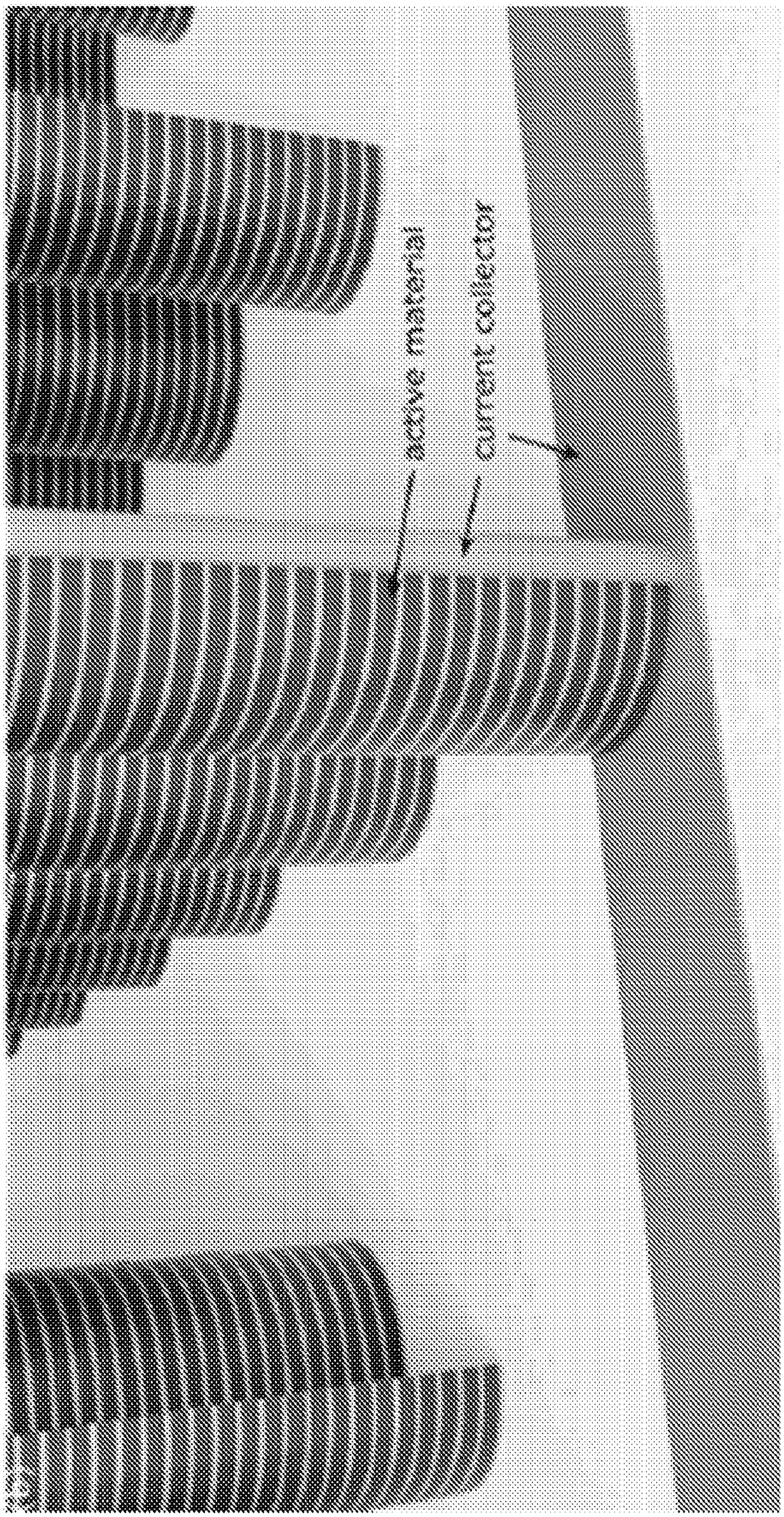

FIG. 5*a* and FIG. 5*b* are schematics of a 3D interdigitated micro-supercapacitor fabricated by depositing current collector and the active materials alternatively in the vertical direction, in accordance with some embodiments. Embodiments of the present disclosure that include current collector materials are fabricated using conductive materials such as graphene, activated carbon, carbon nanotube, manganese dioxideruthenium(IV) oxide, conductive polymers, or a combination of them. These materials may require the use of current collector materials. Thus, when certain active materials are used (e.g., graphene, activated carbon, carbon nanotube, manganese dioxide, ruthenium(IV) oxide, etc.), building the 3D interdigitated electrodes is achieved by the stacking of the current collector and the active electrode material alternatively.

Other embodiments are fabricated from materials such as metal oxides, metal sulfides, metal nitrides, metal hydroxides or nanoparticle materials such as silver, gold, platinum, or a combination thereof. In embodiments of the present disclosure, the base of the electrode, the current collector, is made using a conductive material such as titanium-gold alloy or Au or platinum or any other material made by methods such as physical vapor deposition or chemical vapor deposition or 3D printing or any other material.

Figure 6A:
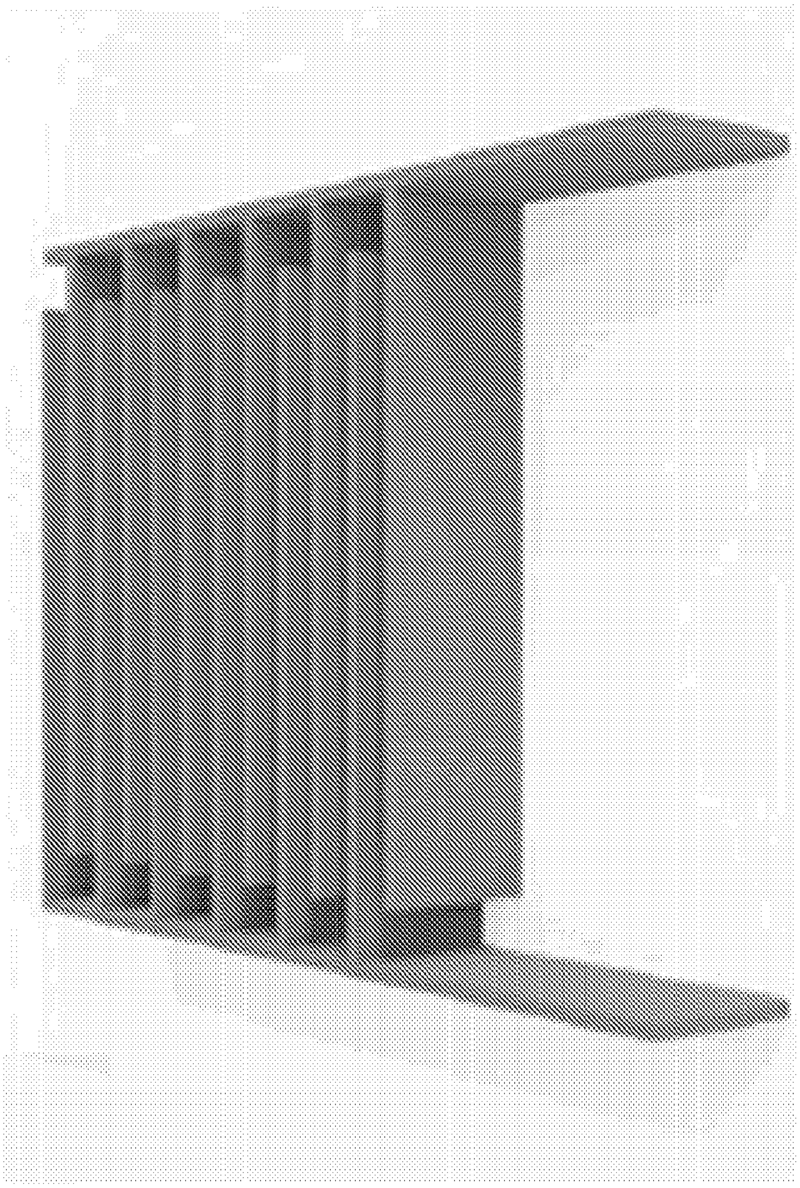
FIG. 6*a* and FIG. 6*b* are schematic diagrams of an electrode architecture with straight walls, in accordance with some embodiments.
Figure 6B:
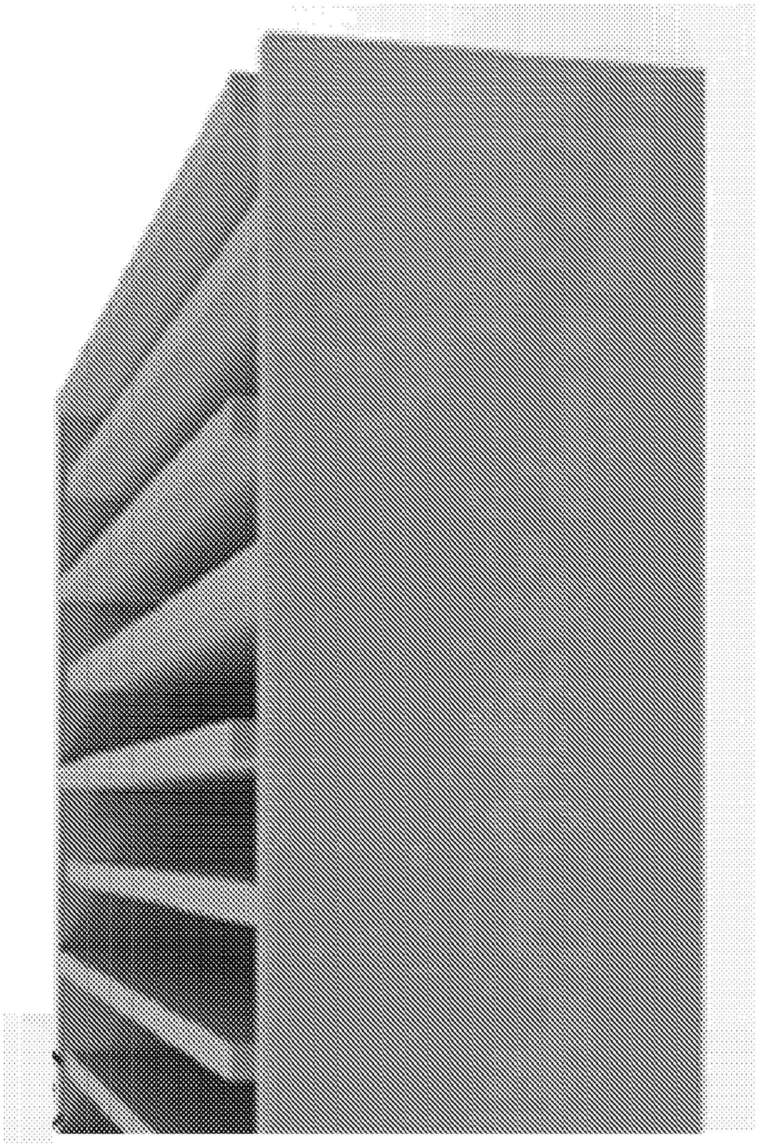
Figure 7A:
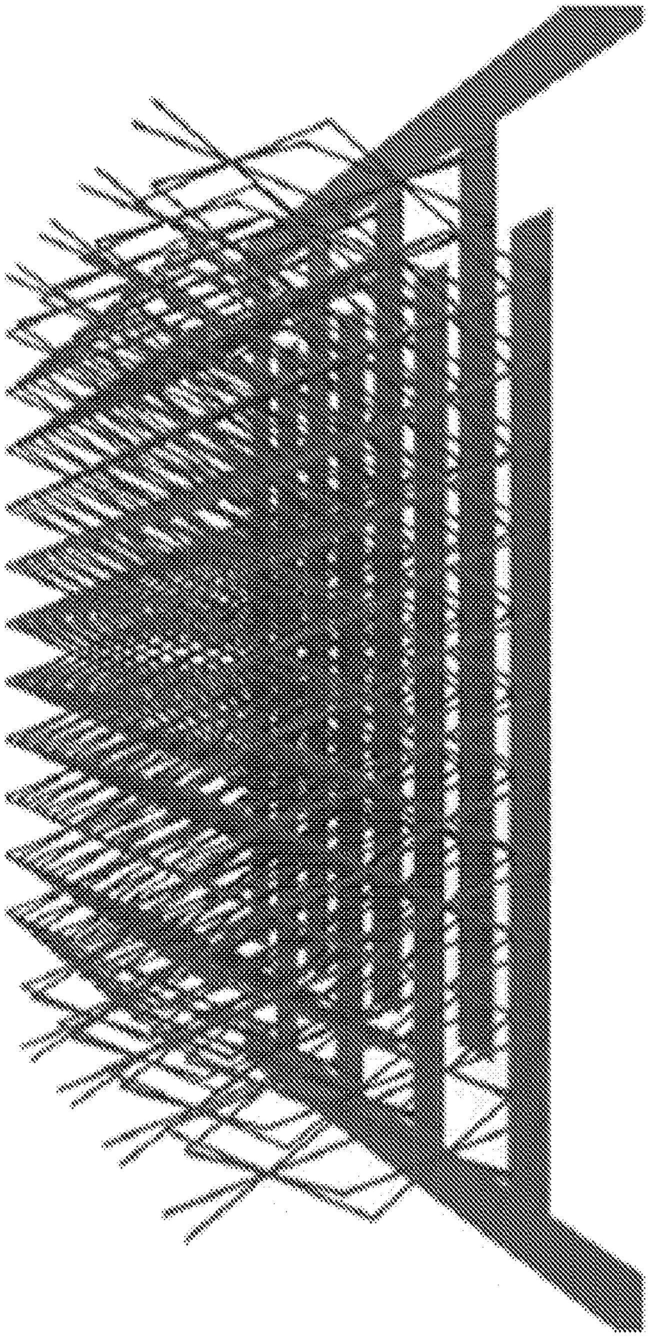
FIG. 7*a*, FIG. 7*b*, and FIG. 7*c* are schematic diagrams of an electrode architecture with a regular micro-lattice, in accordance with some embodiments.
Figure 7B:
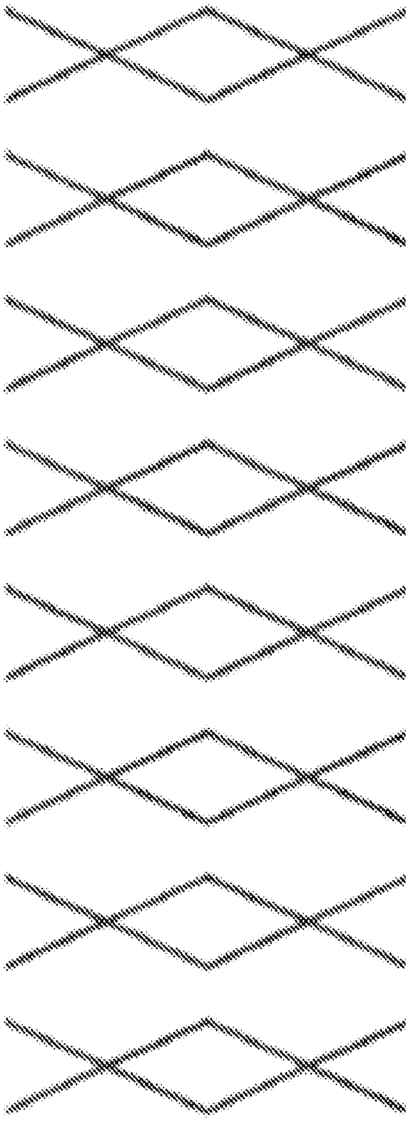
Figure 7C:
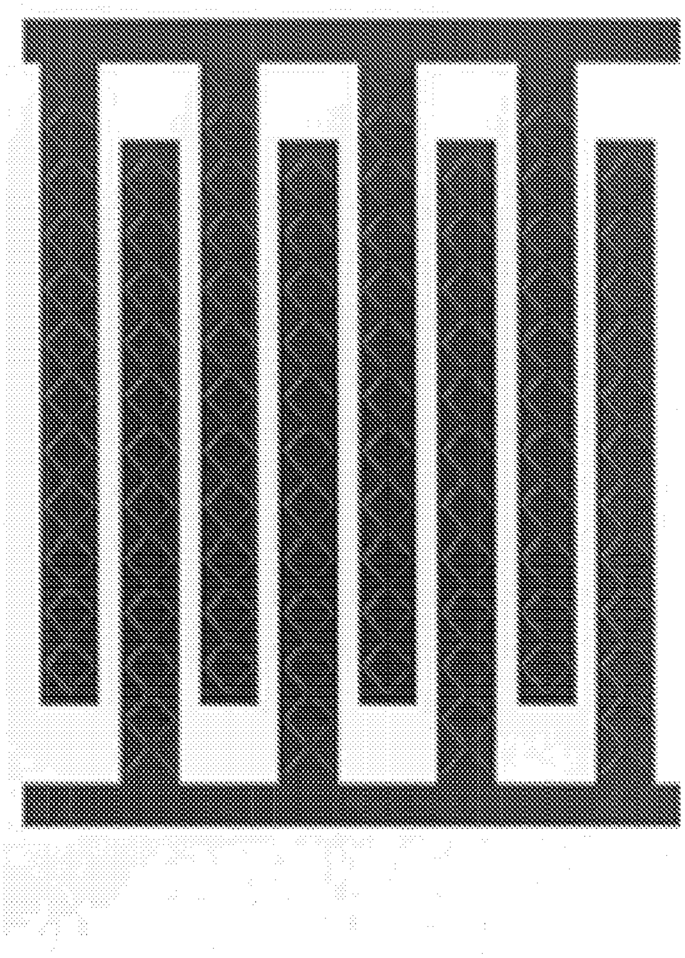
Figure 8A:
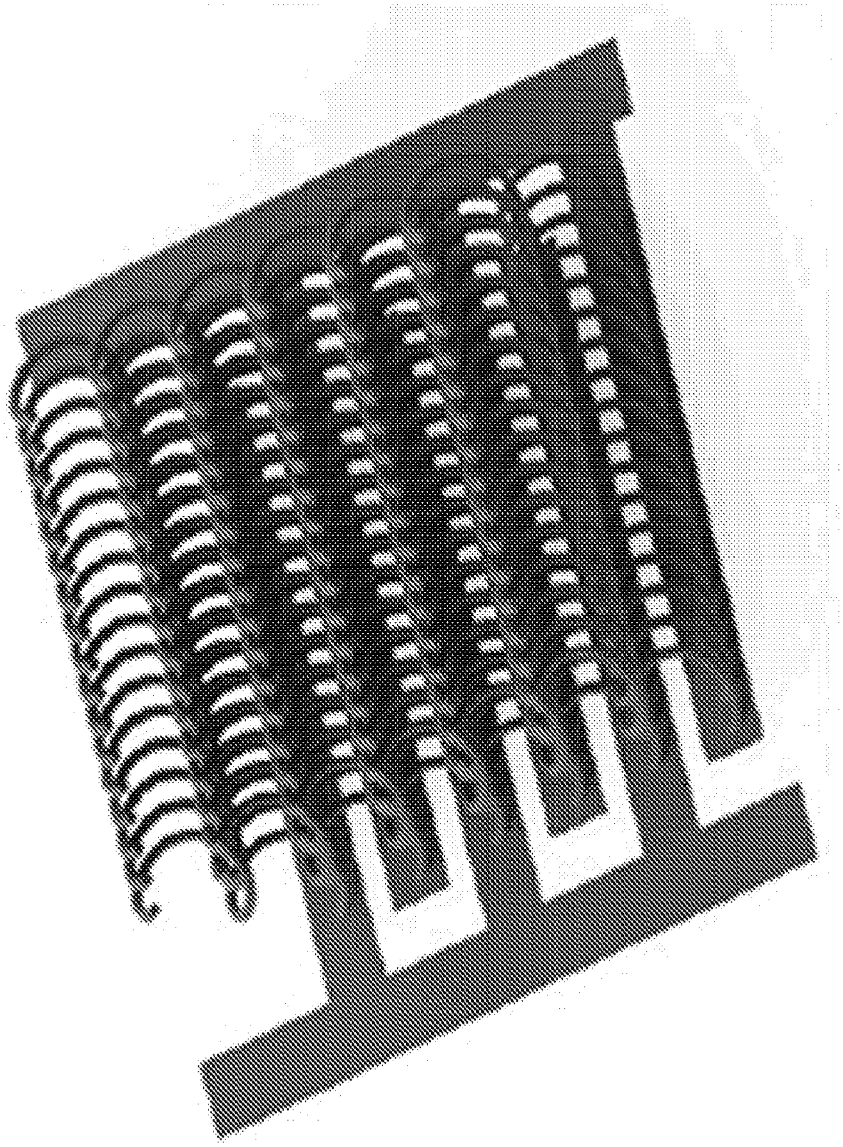
FIG. 8*a* and FIG. 8*b* are schematic diagrams of an electrode architecture with spirals, in accordance with some embodiments.
Figure 8B:
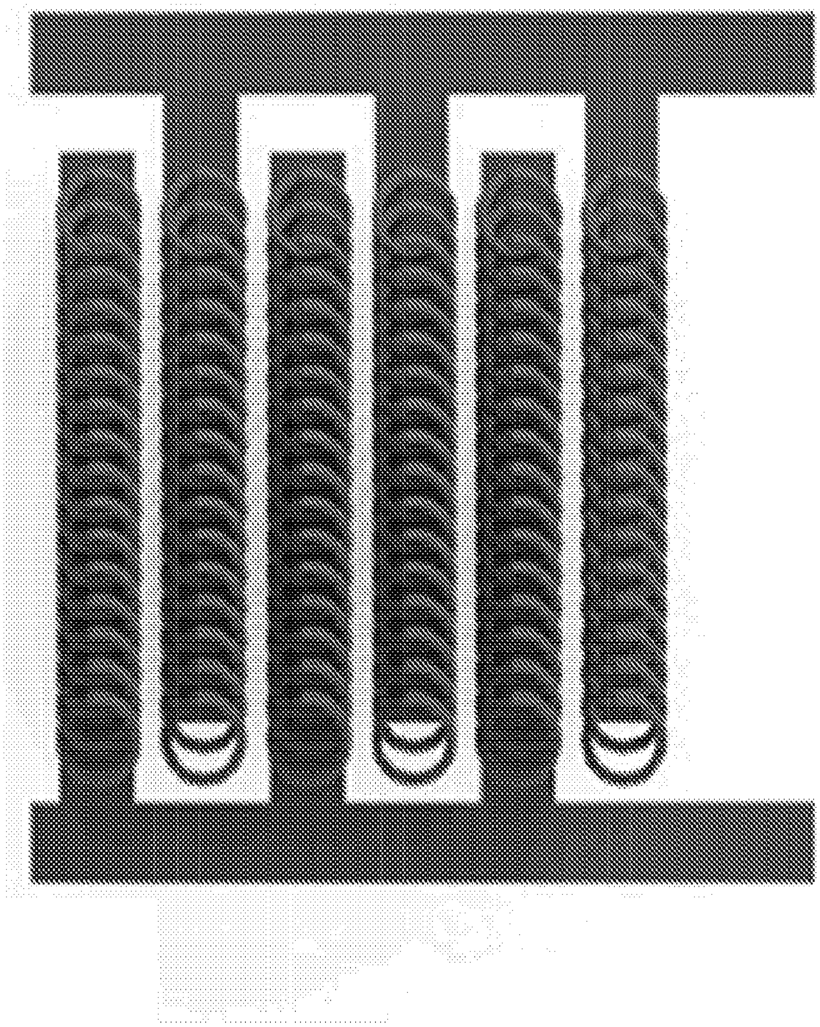
Figure 9A:
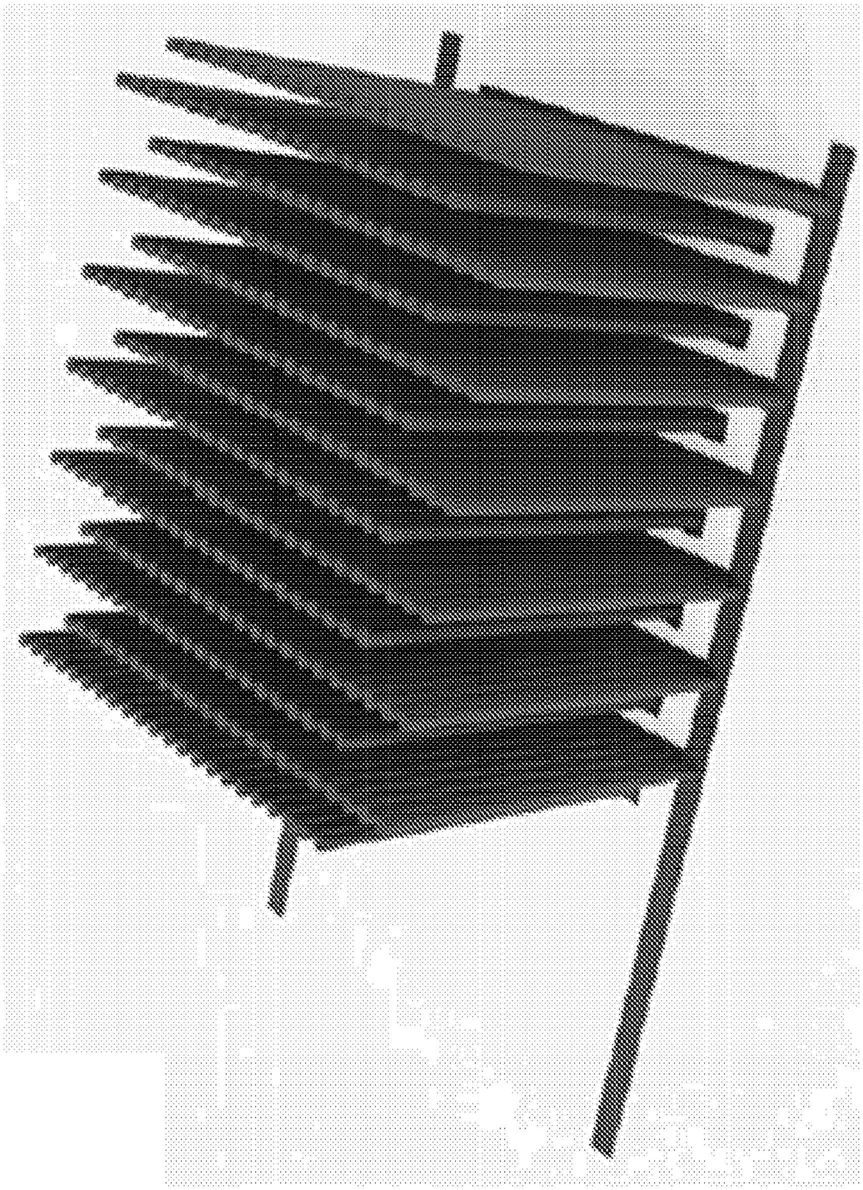
FIG. 9*a* and FIG. 9*b* are schematic diagrams of an electrode architecture with micro-pillars, in accordance with some embodiments.
Figure 9B:
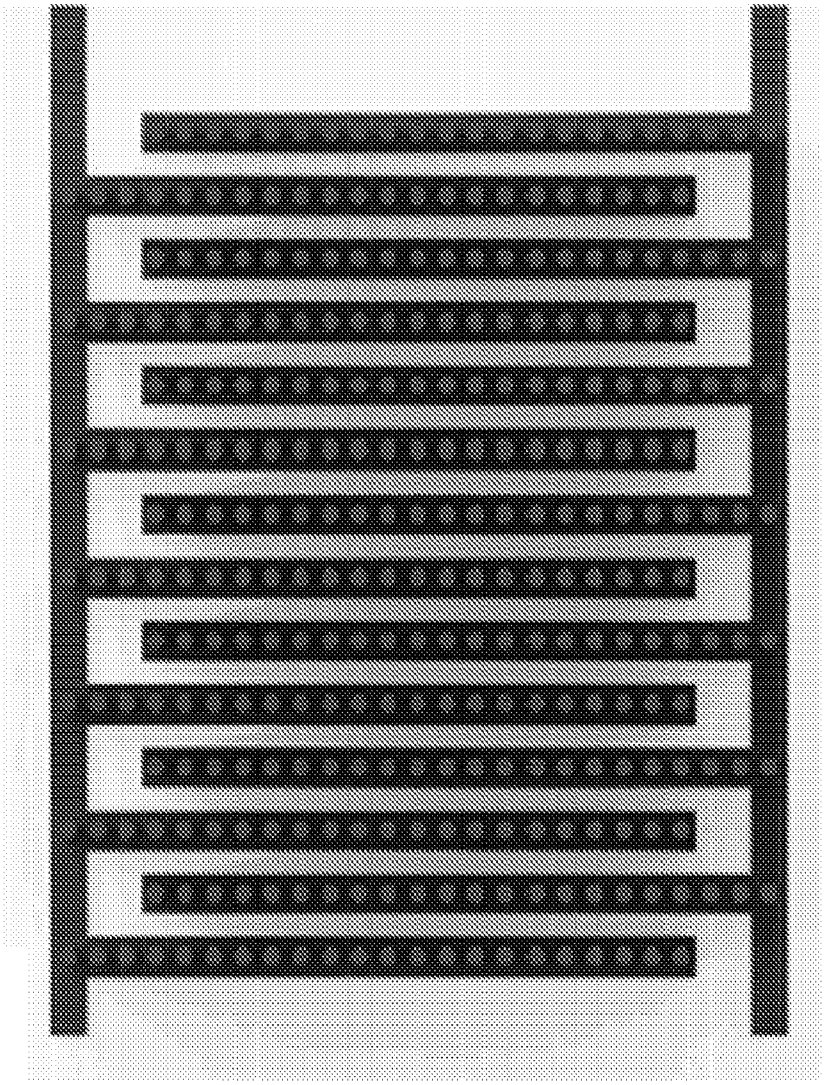
Figure 10A:
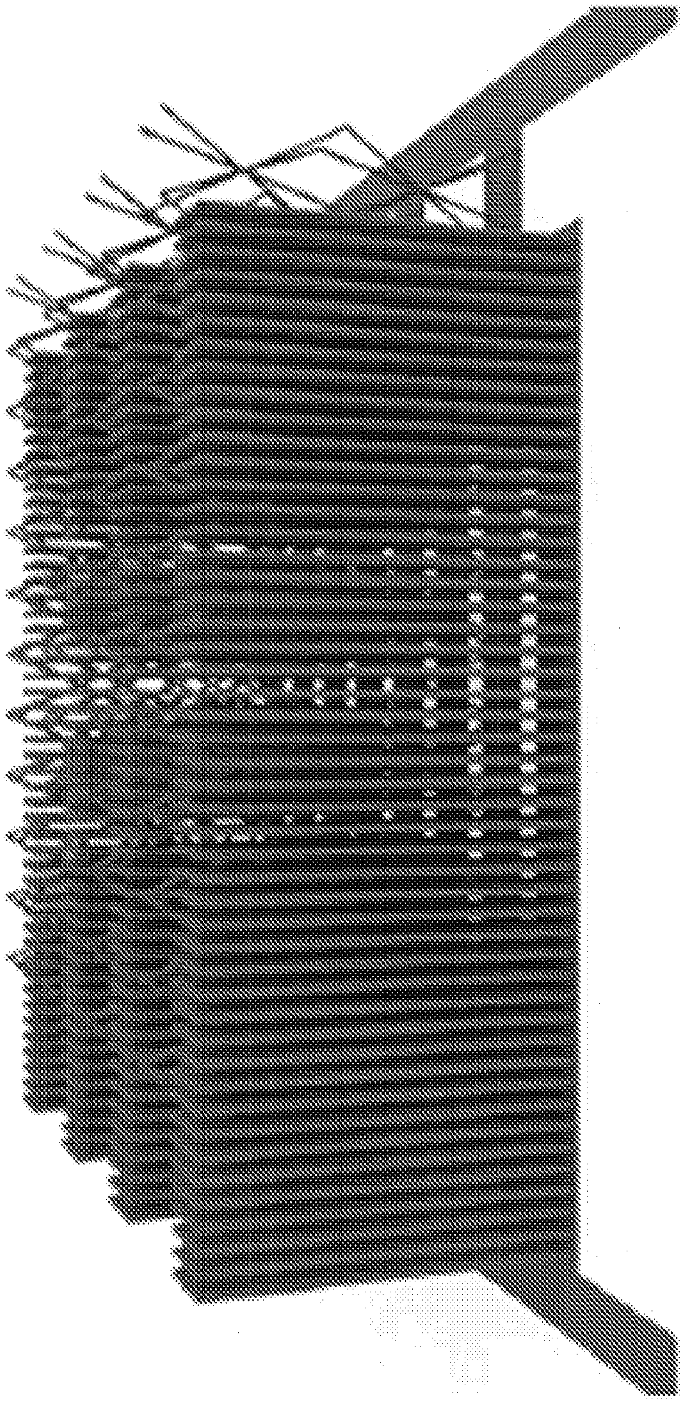
FIG. 10*a*, FIG. 10*b*, and FIG. 10*c* are schematic diagrams of an electrode architecture with a combination of a micro-lattice and micropillars, in accordance with some embodiments.
Figure 10B:
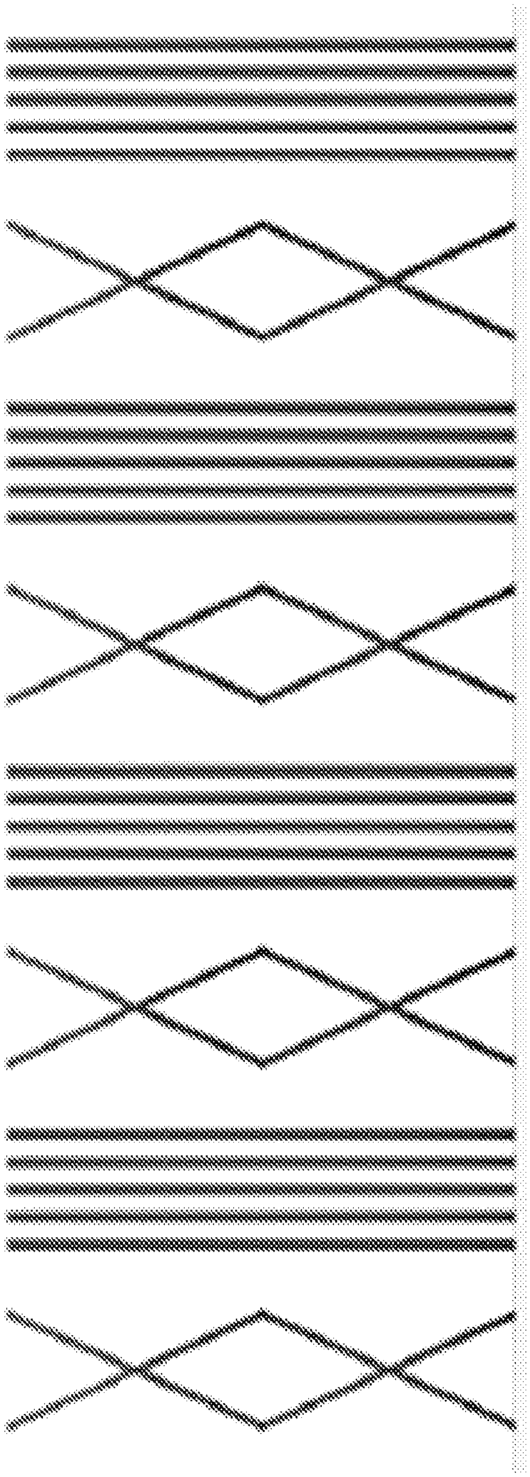
Figure 10C:
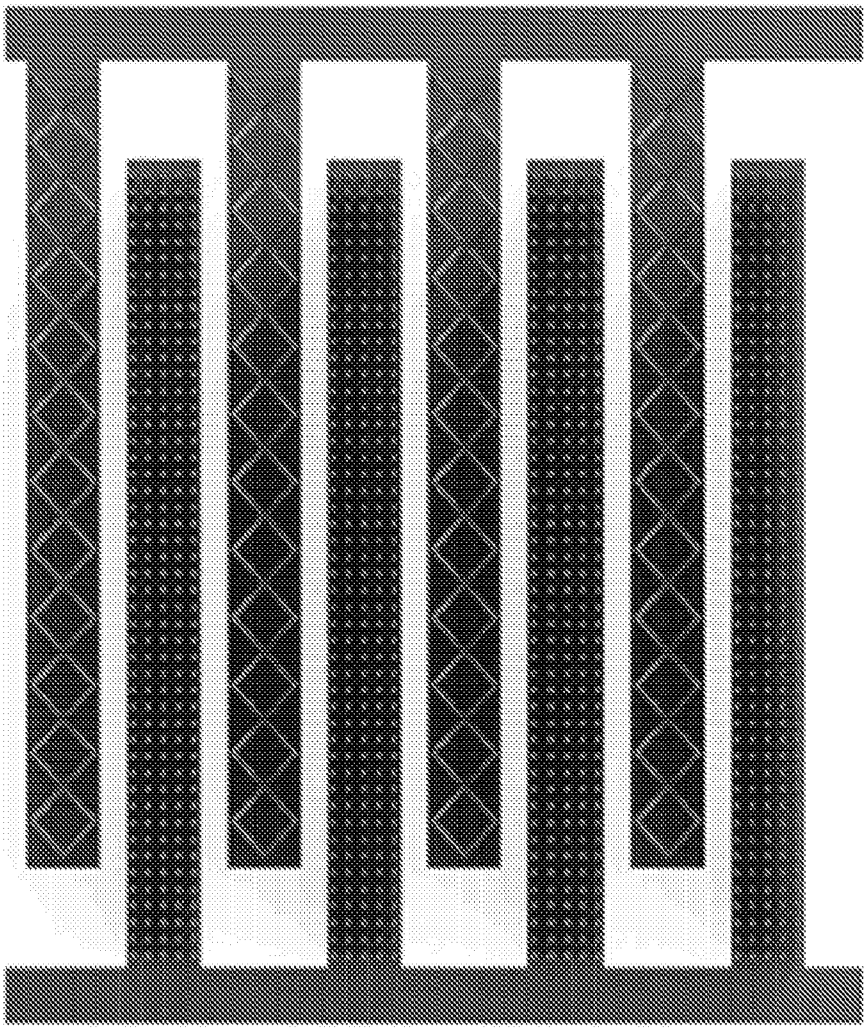

In some embodiments, rather than using wavy microwalls (as depicted in FIG. 5 and other figures), the micro-supercapacitors have straight microwalls, regular and irregular micro-lattices, spirals, micropillars, or some combination of various arbitrary shapes. FIG. 6*a* and FIG. 6*b* are schematics of the 3D interdigited micro-supercapacitor with straight microwalls, in accordance with some embodiments. FIGS. 7*a*-7*c* are schematics of the interdigitated electrode architecture with a regular-lattice from different view angles, in accordance with some embodiments. In some embodiments, the electrode architecture is an irregular micro-lattice. FIG. 8*a* and FIG. 8*b* are schematics of an interdigitated electrode architecture with spirals, in accordance with some embodiments. FIG. 9*a* and FIG. 9*b* are schematics of an interdigitated electrode architecture with micropillars, in accordance with some embodiments. FIGS. 10*a*-10*c* are schematics of an interdigitated electrode architecture with a combination of micro-lattice and micropillars, in accordance with some embodiments.

In some embodiments, the micro-supercapacitor includes a plurality of 3D electrodes arbitrarily interwoven between each other but electrically isolated from each other. In some embodiments, the plurality of 3D electrodes include arbitrary shapes with overhang structures. More specifically, in some embodiments, the 3D electrodes comprise arbitrary shapes with electrical isolation between electrodes by means of overhang structures or printing of an insulating structure.

Figure 11A:
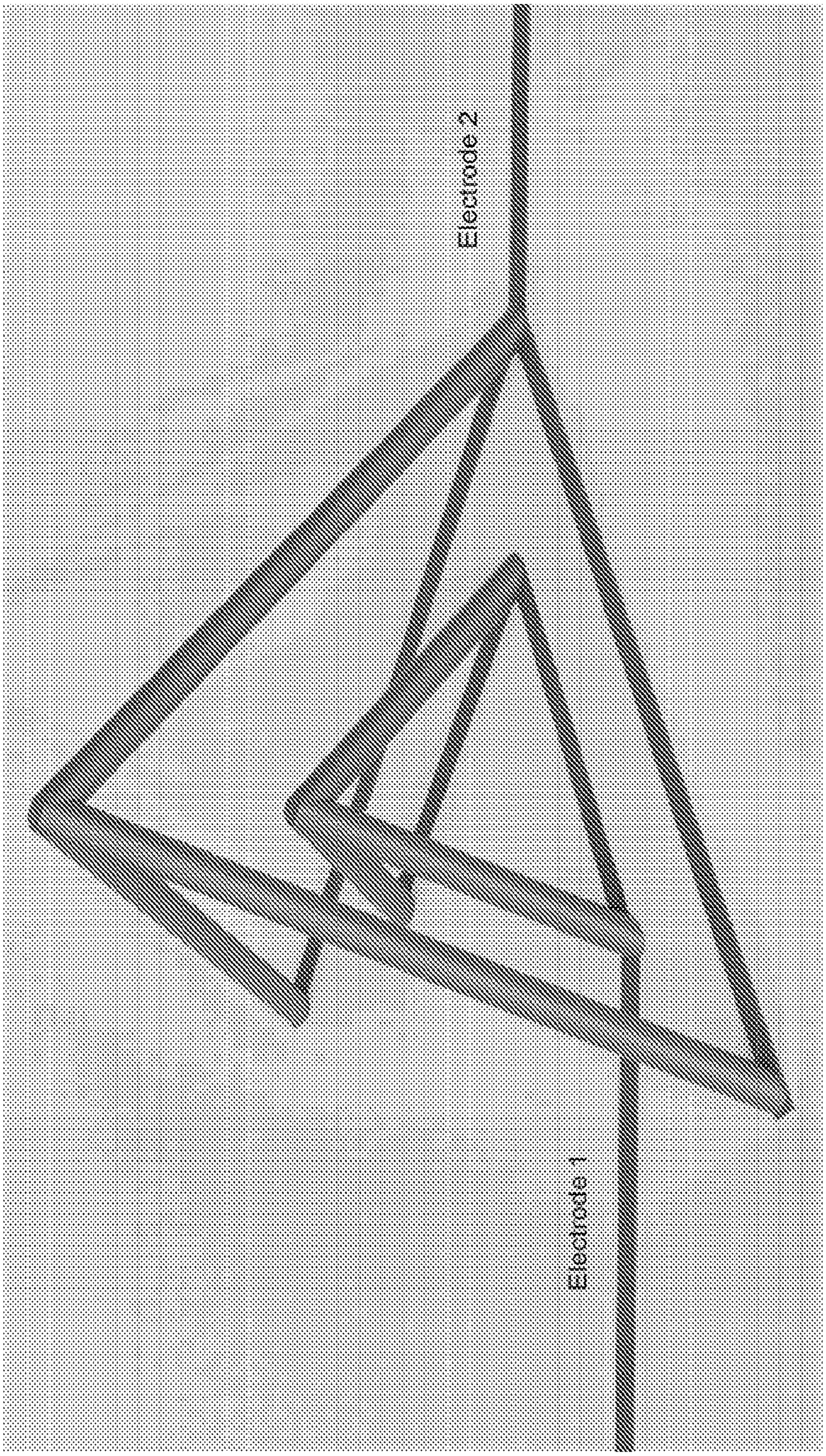
FIGS. 11*a*-11*e* are schematic diagrams of electrodes with electrical isolation, in accordance with some embodiments.
Figure 11B:
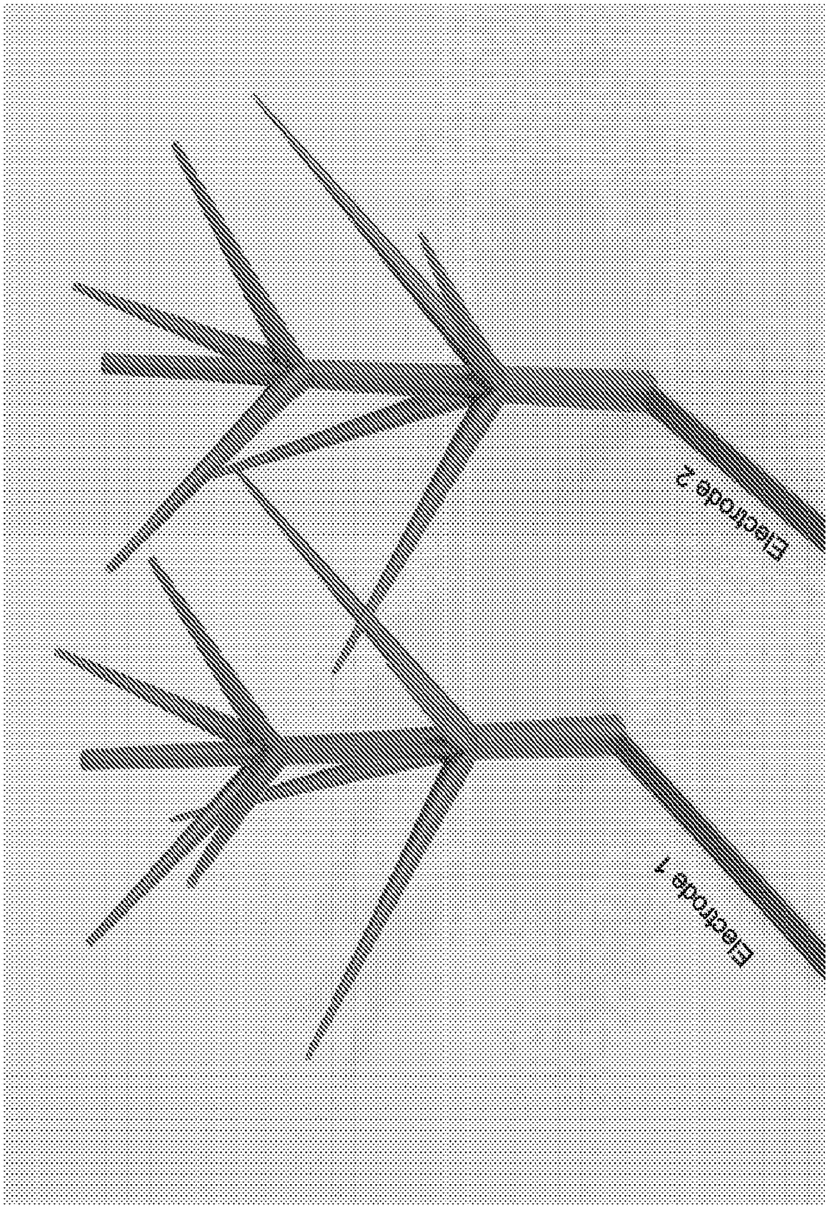
Figure 11C:
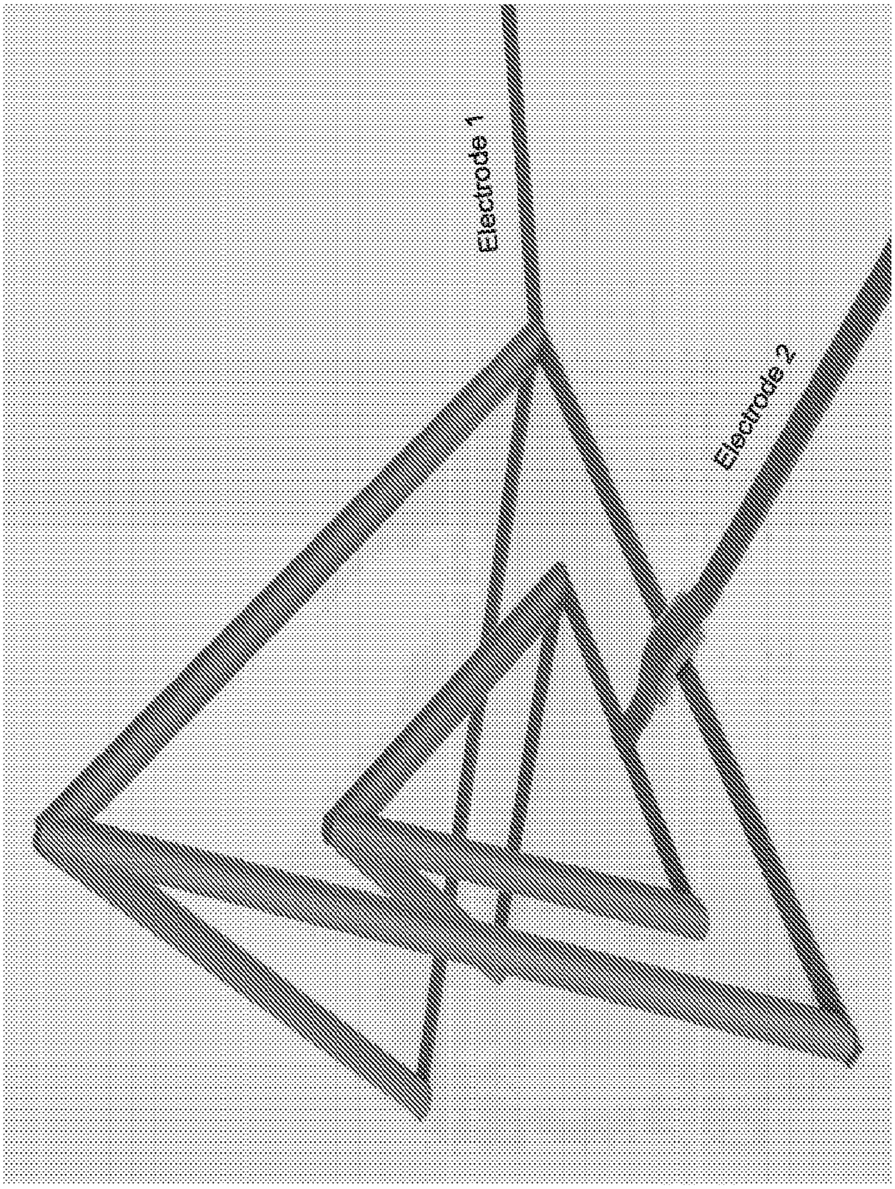
Figure 11D:
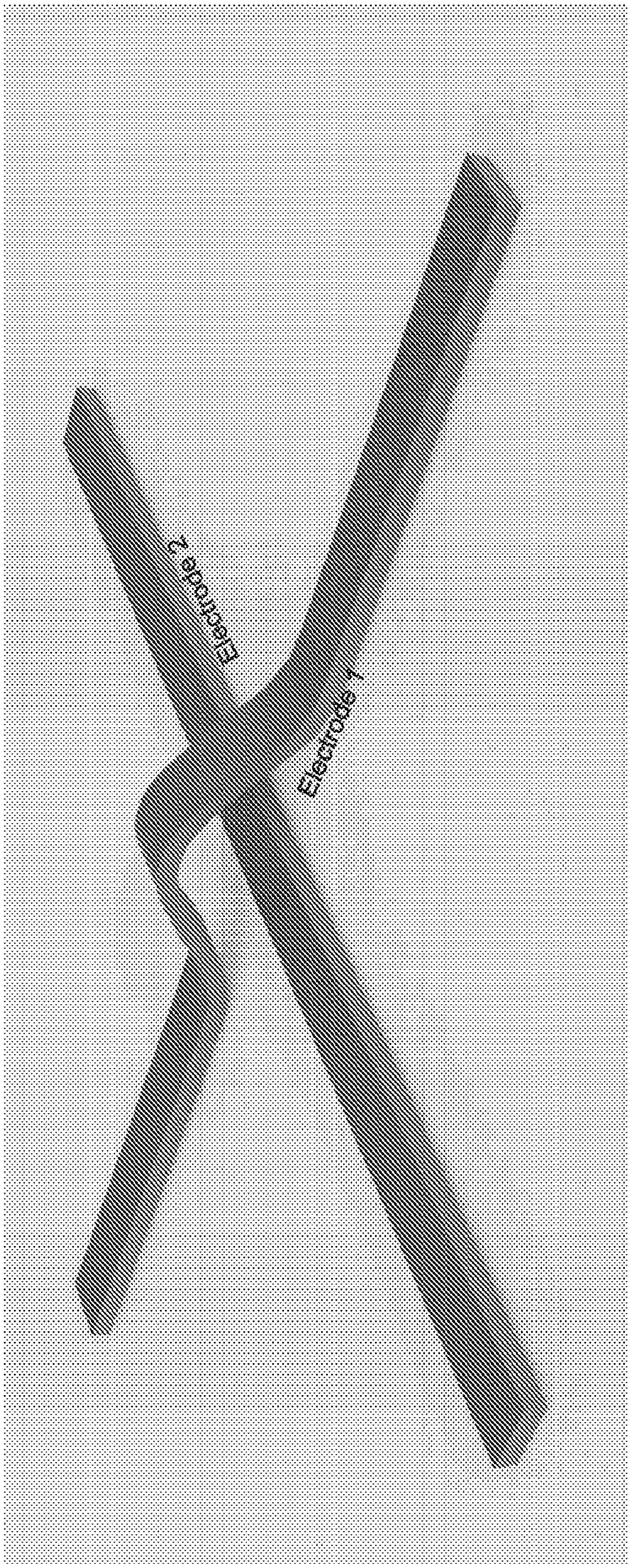
Figure 11E:
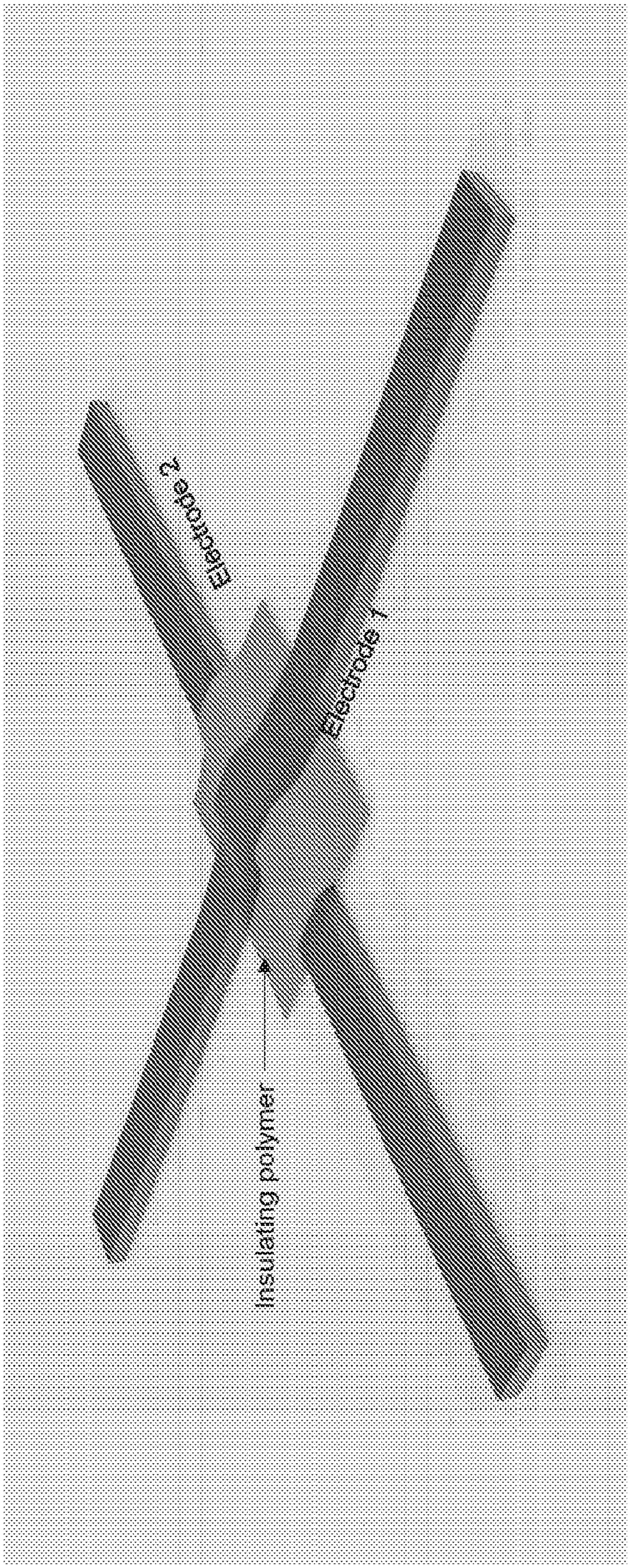

FIG. 11*a* is a schematic depicting two interwoven triangular shaped MXene electrodes that are electrically isolated from each other, in accordance with some embodiments. FIG. 11*b* is a schematic depicting MXene electrodes having tree shapes that are electrically isolated from each other. FIG. 11*c* is a schematic depicting two interwoven triangular shaped MXene electrodes that are electrically isolated from each other, where the electrodes were created by printing an isolation layer on top of a bottom electrode, in accordance with some embodiments. FIG. 11*d* is a schematic depicting two electrically isolated MXene electrodes directly created by printing overhang structures, while FIG. 11*e* is a schematic depicting two electrically isolated MXene electrodes created by printing an isolation layer on top of a bottom electrode, in accordance with some embodiments.

Figure 12A:
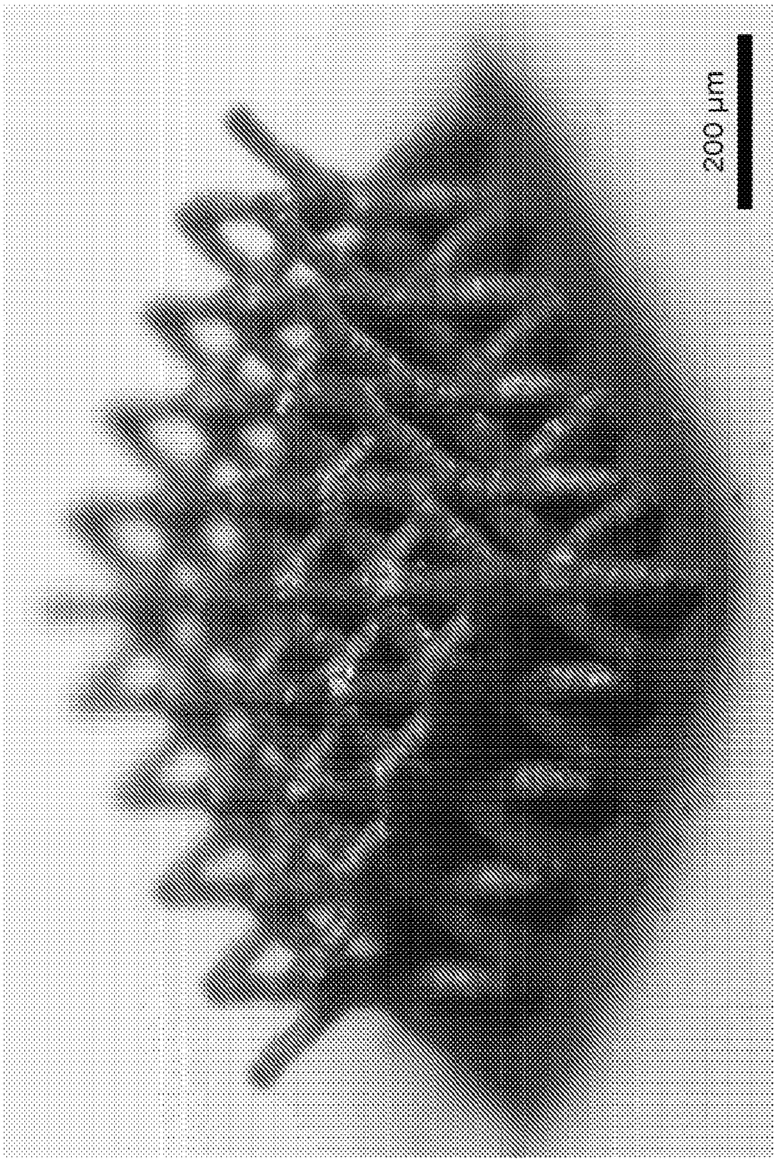
FIGS. 12*a*-12*e* are optical images of MXene electrode architectures, in accordance with some embodiments.
Figure 12B:
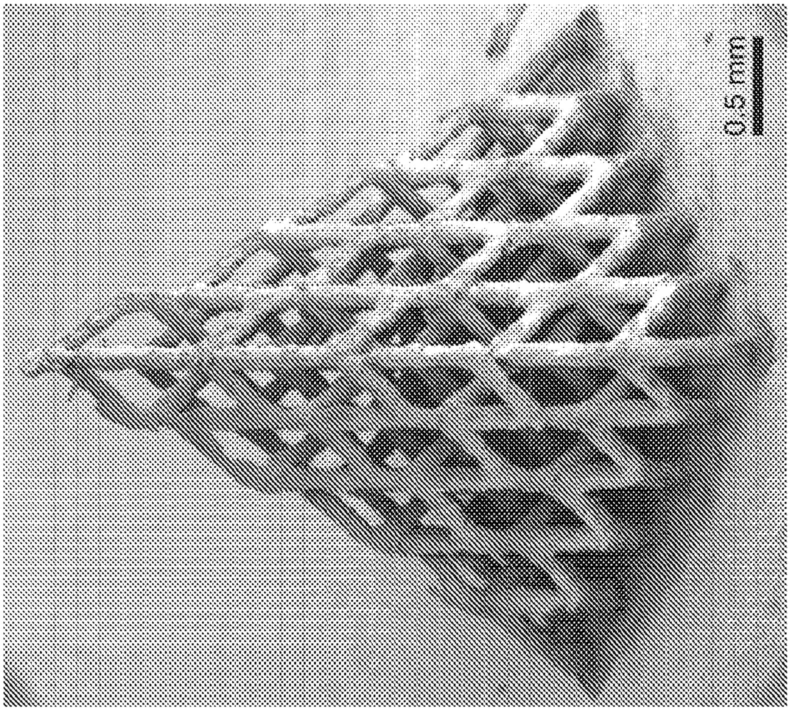
Figure 12C:
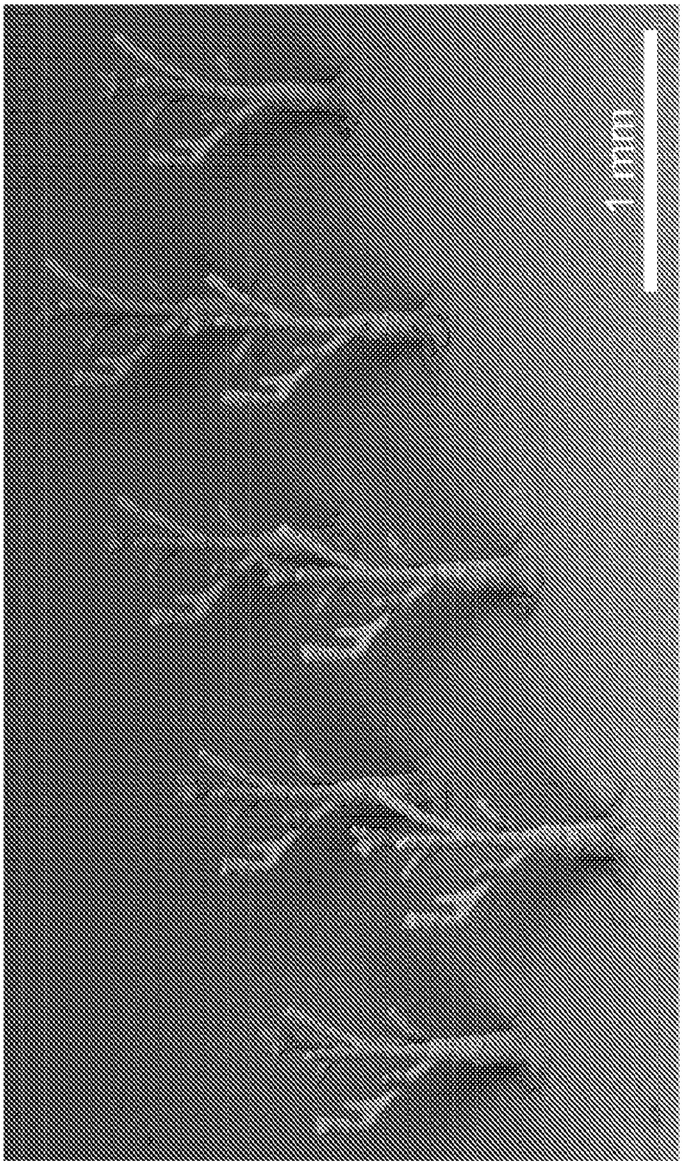
Figure 12D:
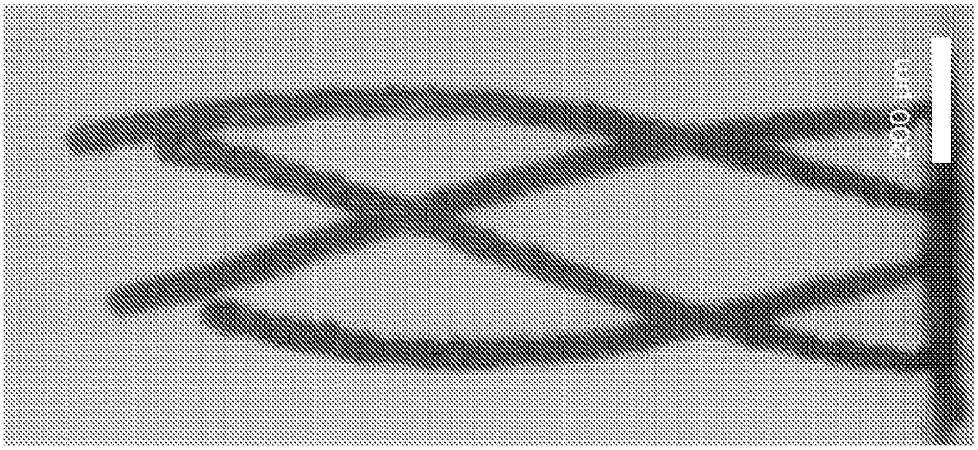
Figure 12E:
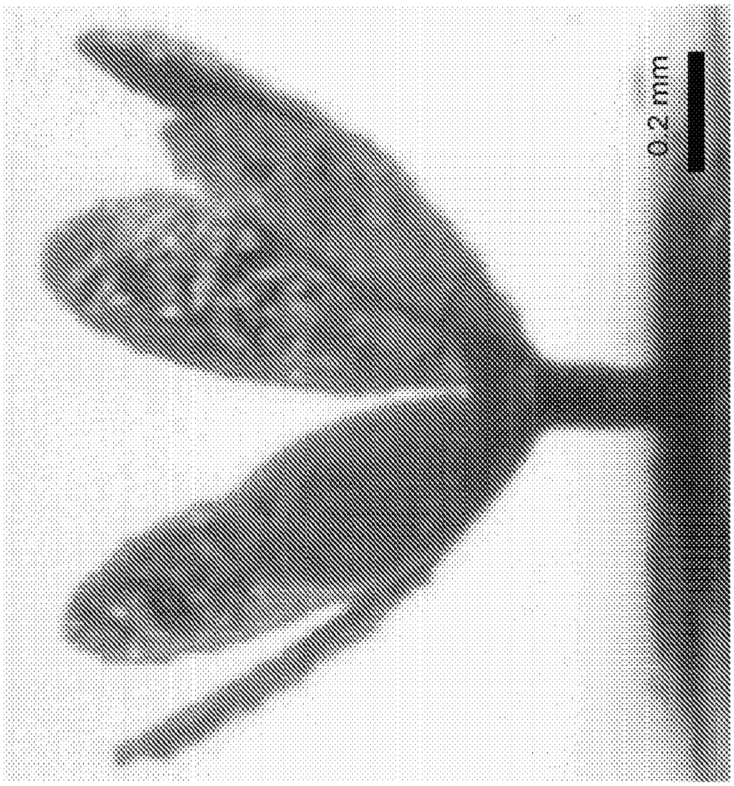

FIGS. 12*a*-12*e* are images of MXene microarchitectures printed using aerosol jet 3D printing, illustrating electrodes having complex shapes, in accordance with some embodiments. FIG. 12*a* is an image of a regular micro-lattice. FIG. 12*b* is an image of pyramid shaped MXene microarchitectures. FIG. 12*c* is an image of tree-shaped MXene electrodes with electrical isolation. FIG. 12*d* is an image of spiral micro-pillars, while FIG. 12*e* is an image of a flower-shaped MXene electrode.

In some embodiments the method of forming a micro-supercapacitor comprises using non-contact 3D printing. The benefits of non-contact printing include, but are not limited to, the printability of the ink being less dependent on the fluidic properties of the ink, and the ability to have overhang features without support structures. In contrast, contact printing, such as extrusion-based printing, is sensitive to the fluidic properties of the ink and incapable of overhang structures without support.

In embodiments of the present disclosure, the 3D printing method used is aerosol jet printing, where the nanomaterial is carried by droplets that are then deposited at the desired location. In some embodiments, the size of the droplet is less than 50 μm. In some embodiments, the size of the droplet is between 5 μm and 10 μm.

Figure 13A:
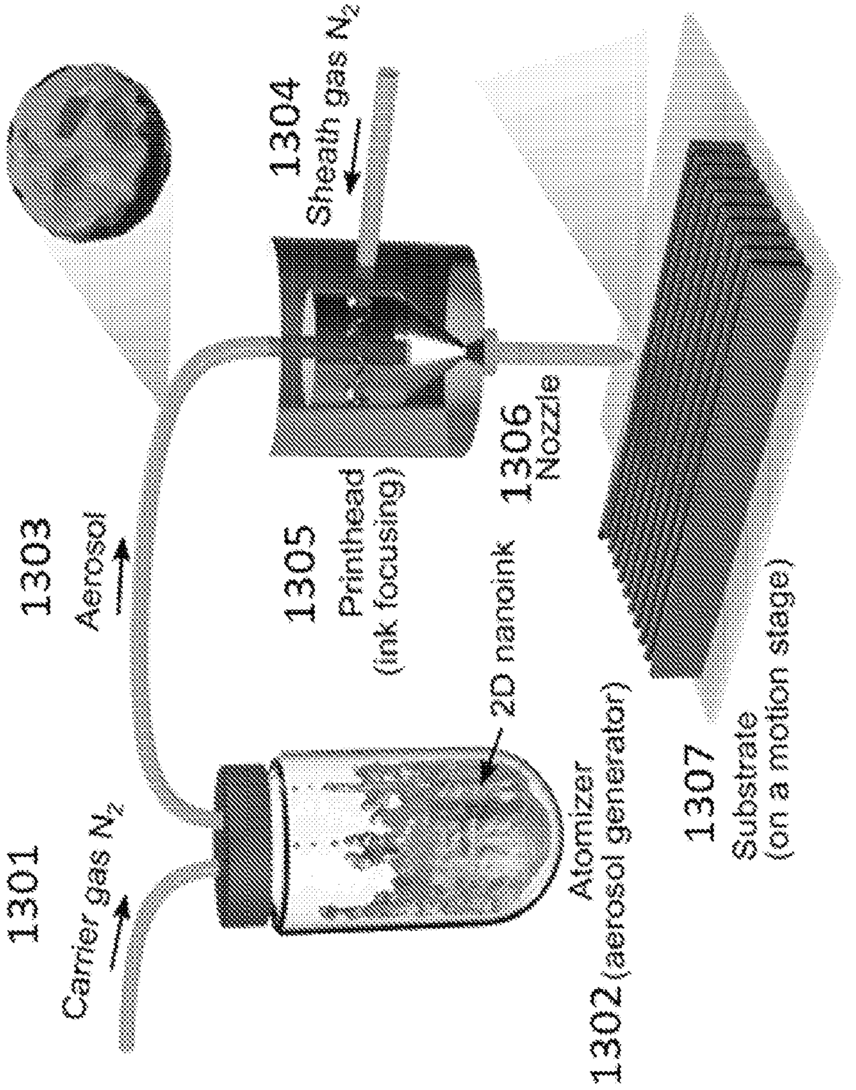
FIG. 13*a* is a schematic diagram of the aerosol jet printing process of two-dimensional (2D) MXene, in accordance with some embodiments.

FIG. 13*a* is a diagram illustrating a method of fabricating 3D microarchitectures using aerosol jet printing of 2D MXene, in accordance with some embodiments. As shown in FIG. 13*a*, carrier gas 1301 is received by atomizer 1302, an aerosol generator. In some embodiments, the carrier gas 1301 is $N_2$. The atomizer 1302, which aerosolizes nanoink made of 2D MXene, creates the aerosol 1303. The aerosol 1303 is carried by carrier gas 1301, and the aerosol 1303 and the sheath gas 1204 are received by the printhead 1305. In some embodiments, the sheath gas 1304 is $N_2$, and the sheath gas 1304 focuses the aerosol 1303 at the nozzle 1306, layering 2D nanomaterials onto substrate 1307. In some embodiments, droplet dynamics at microscales enable the assembly of MXene sheets in the 3D space without any support structures. Additionally, in some embodiments, the shapes and dimensions of the printed architectures are controlled arbitrarily by CAD programs.

In some embodiments, the printed 3D structures have no binders or solvents upon drying, resulting in no noticeable shrinkage. This is unlike other liquid-ink based printing techniques such as extrusion printing, where shrinkage could be substantial in the absence of special post-printing treatment, such as freeze drying. Furthermore, compared with other high-resolution printing techniques such as e-jet printing and inkjet printing, the aerosol jet printing can effectively bypass the nozzle clogging issue due to the fact that the ink does not physically contact the nozzle internal surface during printing, owing to the presence of the sheath gas.

In some embodiments, the printing ink comprises nanoparticles suspended in a solvent. In some embodiments, the printing ink is dispensed to deposit a layer of the 2D nanomaterial and heat, or another form of energy is used to remove the solvent from the deposited layer. In some embodiments, the fabrication process is rapid under ambient conditions due to the rapid droplet evaporation process happening within a fraction of a second at the microscale.

Figure 13B:
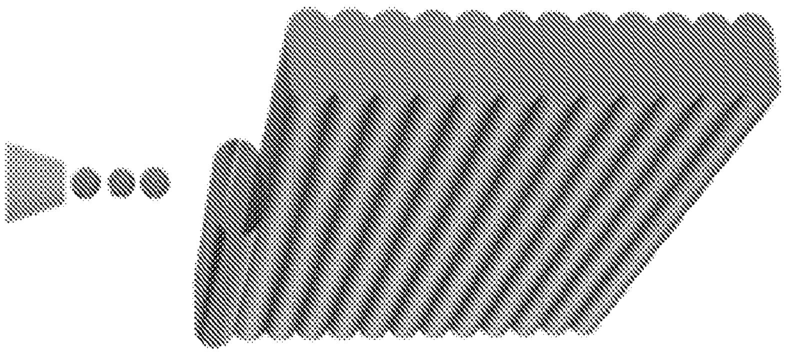
FIG. 13*b* is a schematic diagram depicting the stacking of nanomaterials during an aerosol jet printing process, in accordance with some embodiments.

FIG. 13*b* is a diagram illustrating a zoomed-in 3D microarchitecture to show the stacking of layers during the aerosol jet printing process, in accordance with some embodiments. The aerosol droplets containing 2D nanomaterials from the nozzle 1306 are deposited as a single layer, which rapidly loses solvents due to evaporation. This layer then provides the base for the next layer to be deposited, which is held together by surface tension at microscales. As this process continues, the 3D architecture is built without support structures, in accordance with some embodiments. The structure created by the aerosol jet printing process is held together by the van der Waal forces and hydrogen bonding when applicable between the 2D nanomaterials.

Figure 13C:
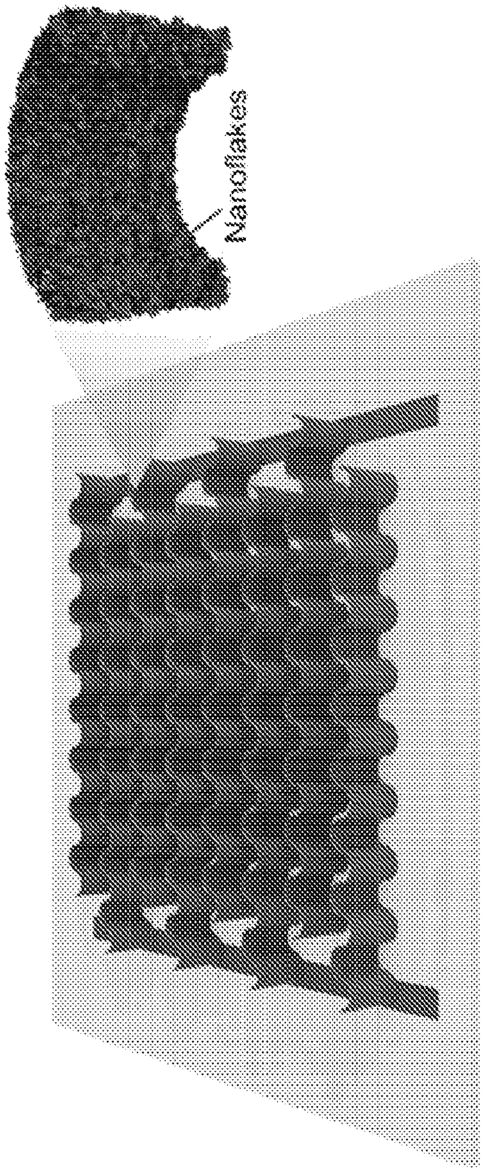
FIG. 13*c* is a schematic diagram depicting a micro-supercapacitor with 3D electrodes printed using an aerosol jet printing process, in accordance with some embodiments.

FIG. 13*c* is a schematic of $Ti_3C_2$ MXene-based micro-supercapacitors with 3D electrodes printed using the aerosol jet printing process, in accordance with some embodiments. The 3D construction of the electrodes substantially enhances the areal loading of the active materials, such as MXene, as compared to 2D micro-supercapacitors. In some embodiments, the structurally engineered wavy wall configuration of the electrodes further increases the areal loading of the active material. FIG. 13*c* also shows that the 3D electrode consists of 2D nanoflakes.

Although the example of FIG. 13*a* utilizes aerosol jet 3D printing, other embodiments utilize different non-contact 3D printing techniques. These non-contact 3D printing techniques include for instance, electrohydrodynamic printing and inkjet printing, where the resolution of the individual features of the 3D electrodes is less than 200 μm.

Figure 14A:
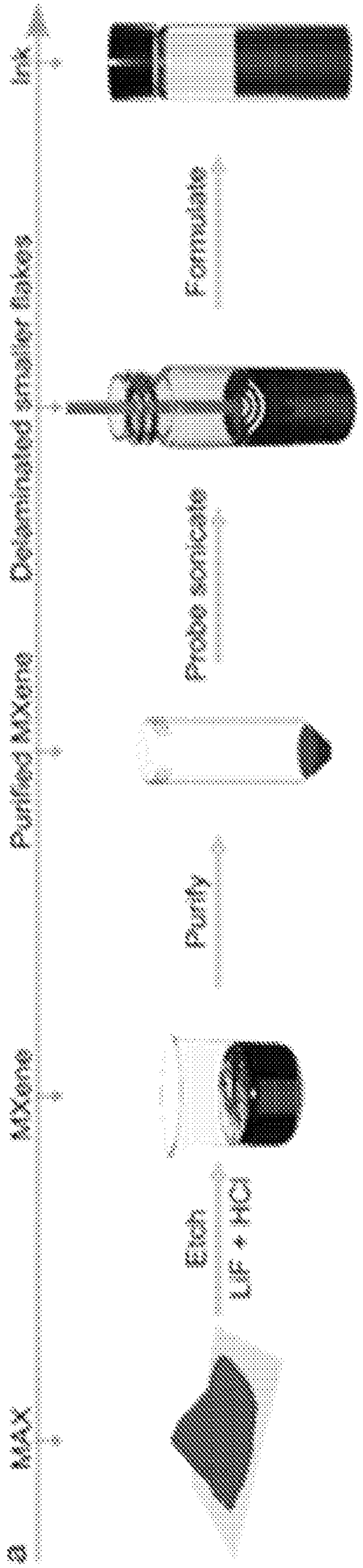
FIG. 14*a* is a schematic diagram depicting ink preparation of MXene, in accordance with some embodiments.

FIG. 14*a* is a diagram of the process of obtaining the additive-free 2D $Ti_3C_2$ MXene ink for aerosol jet printing, in accordance with some embodiments. $Ti_3AlC_2$ MAX phase is first etched with HF formed in situ, and $Ti_3C_2$ MXene is then obtained as the reaction product. Subsequently, $Ti_3C_2$ MXene is purified using copious DI water until the pH reaches about 6. The obtained multilayer $Ti_3C_2$ MXene is probe ultrasonicated, yielding delaminated $Ti_3C_2$ MXene with smaller flake size, and, in turn, ensuring effective aerosolization of the MXene during aerosol jet printing (AJP). Finally, the concentration of the $Ti_3C_2$ MXene is tuned to suit the aerosol jet printing. In some embodiments, the additive free ink comprises the 2D materials such as graphene, MXene, and transition metal dichalcogenide.

Figure 14B:
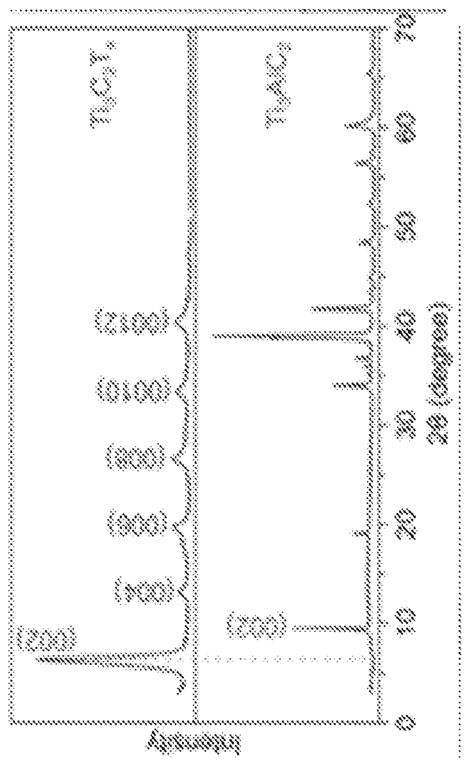
FIG. 14*b* is a graph depicting successful creation of MXene, in accordance with some embodiments.

FIG. 14*b* is a graph confirming the success of the conversion of $Ti_3AlC_2$ MAX to $Ti_3C_2$ MXene based on the process shown in FIG. 14*a*. X-ray diffraction (XRD) patterns and transmission electron microscopy images are first acquired. The characteristic sharp peaks of the $Ti_3AlC_2$ MAX phase, including the most intense one at 39° that pertains to the Al layer, completely vanished after the selective etching treatment, and a series of new, broad peaks evolved, which correspond to the basal plane reflections of the delaminated $Ti_3C_2$ MXene. In addition, the peak of the MAX phase down-shifted from $2\theta=9.5°$ to $2\theta=6.4°$, corresponding to an increase of d spacing from 9.3 Å to 13.8 Å. Both of these observations confirm the successful transformation of the MAX to MXene. The layered structure of the $Ti_3C_2$ MXene revealed by the XRD, the basal plane reflections, was further explored with TEM. The representative TEM micrograph of the $Ti_3C_2$ MXene, seen in FIG. 14*c*, manifested that $Ti_3C_2$ MXene possesses a sheet-like lamellar topology. The high transparency of the TEM image is consistent with the near atomic-thin nature of the $Ti_3C_2$ MXene nanosheets. The well-defined selected area electron diffraction (SAED) pattern confirmed the hexagonal crystal symmetry and high crystallinity of the $Ti_3C_2$ MXene nanosheets.

Figure 14C:
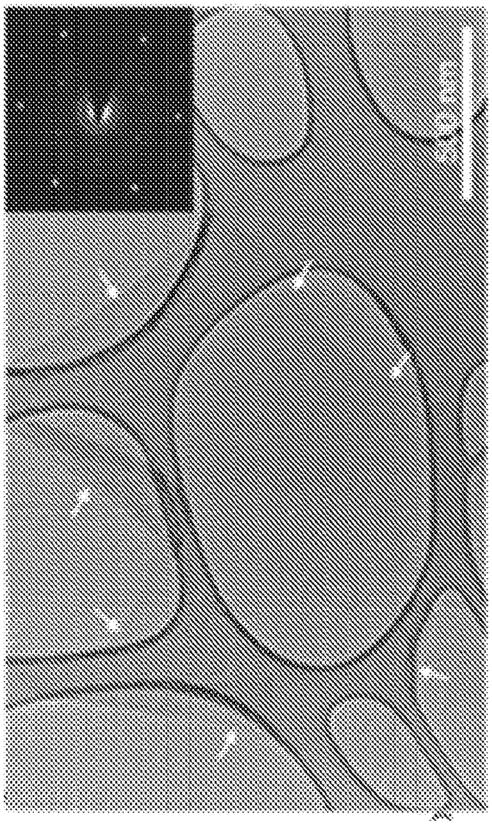
FIG. 14*c* is a transmission electron microscopy (TEM) image of MXene after ink preparation, in accordance with some embodiments.
Figure 14D:
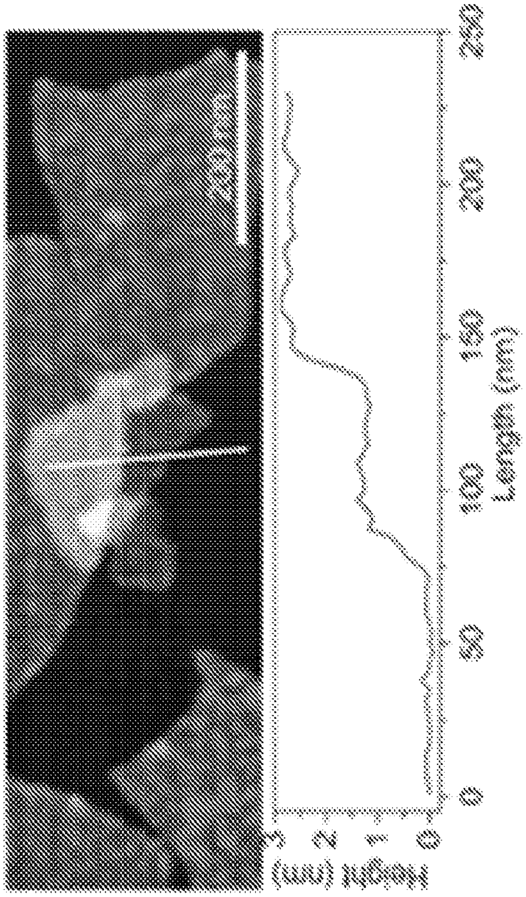
FIG. 14*d* is an atomic force microscopy (AFM) image of the MXene in FIG. 13*c*, in accordance with some embodiments.

FIG. 14*c* is the TEM image of the $Ti_3C_2$ MXene created by the process in FIG. 14*a*, in accordance with some embodiments. The $Ti_3C_2$ boundary is shown in FIG. 14*c* using white arrows. FIG. 14*d* is the AFM image of the as-made $Ti_3C_2$ MXene, seen in the top of the figure and the corresponding height profile of the $Ti_3C_2$ MXene along the line on the graph at the bottom of the figure.

Figure 14E:
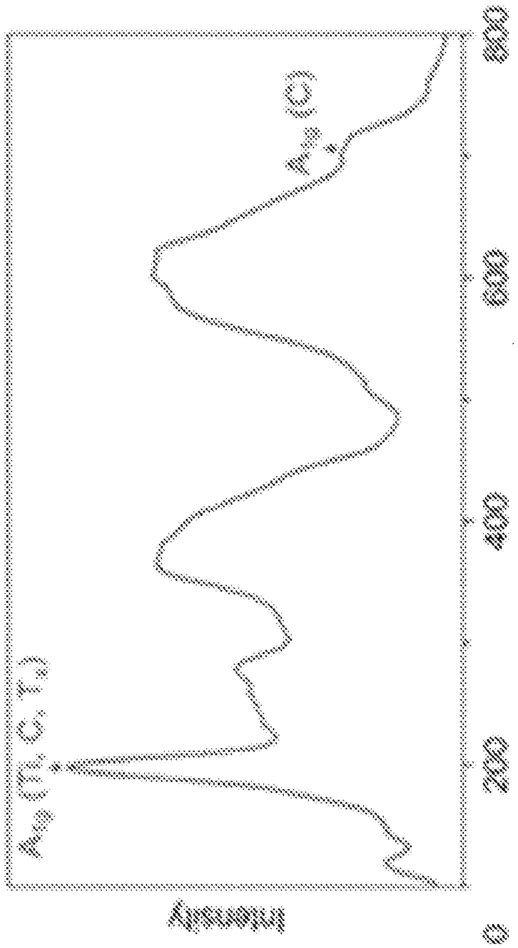
FIG. 14*e* is a graph of a Raman spectrum of MXene, in accordance with some embodiments.
Figure 14F:
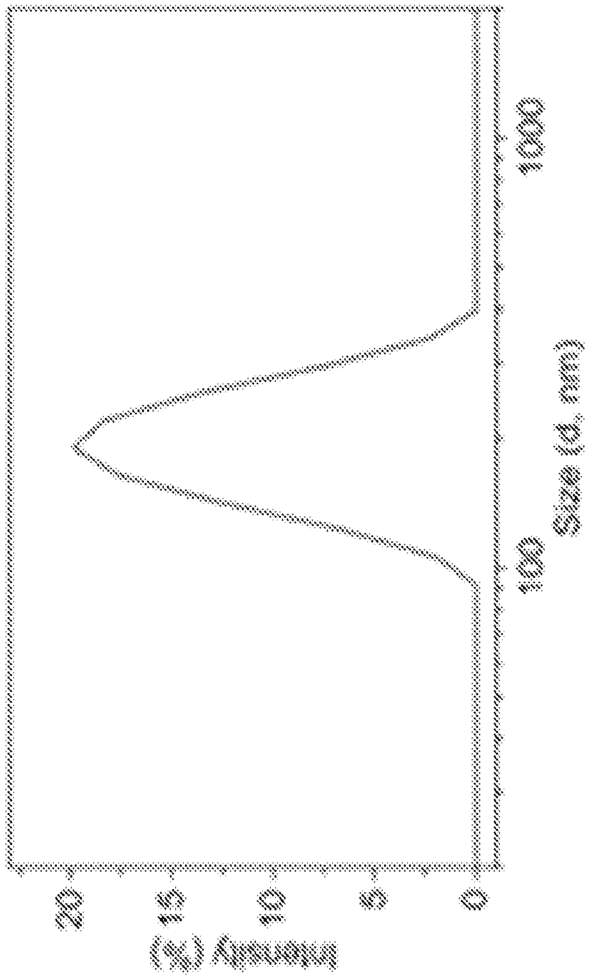
FIG. 14*f* is graph showing a size distribution of nanoflakes, in accordance with some embodiments.
Figure 14G:
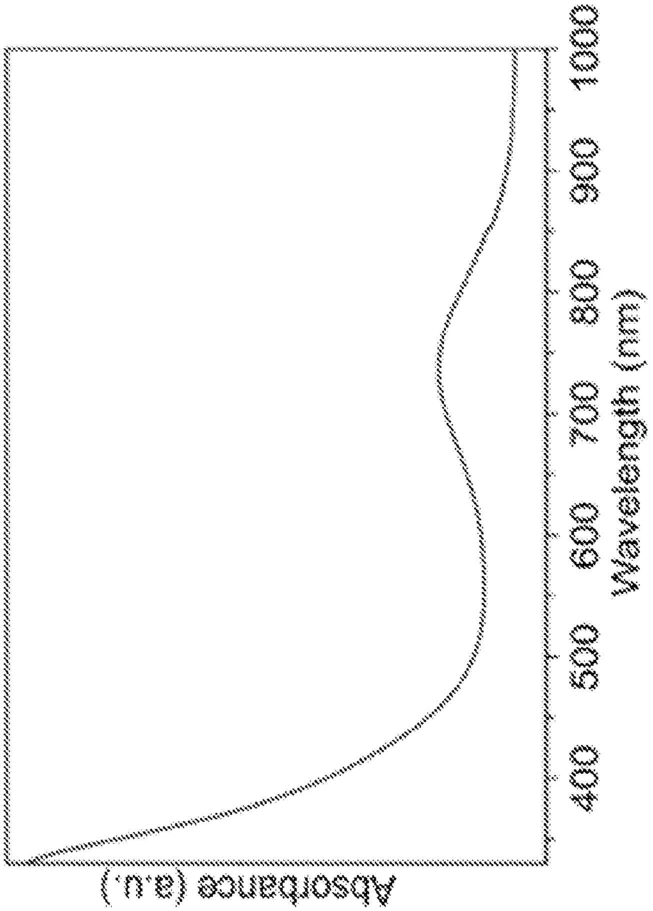
FIG. 14*g* is a graph of the UV-Vis-NIR spectrum of MXene, in accordance with some embodiments.
Figure 14H:
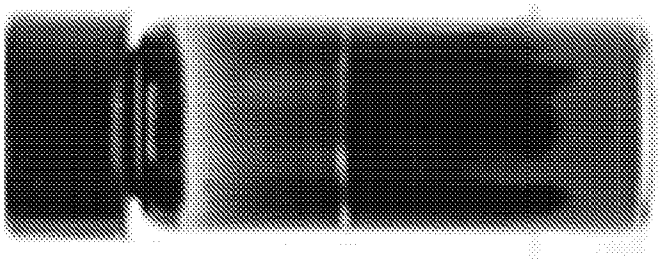
FIG. 14*h* is an optical image of MXene ink, in accordance with some embodiments.

FIG. 14*e* is a graph of the Raman spectrum of $Ti_3C_2$ MXene to show the characteristic peaks. FIG. 14*f* is a graph depicting that the size (i.e. hydrodynamic diameter)_of nanoflakes is center at 221 nm. FIG. 14*g* is a graph of the UV-Vis-NIR spectrum absorption of the $Ti_3C_2$ MXene, showing that the characteristic absorption peak is at roughly 745 nm. This is consistent with the greenish color of the MXene ink. FIG. 14*h* is an optical image of MXene ink created from the process in FIG. 14*a*.

FIG. 15 demonstrates the printability of MXene ink, in accordance with some embodiments. In some embodiments, the aerosol jet printing fabricates high-resolution 2D patterns. FIGS. 15*a*-15*e* are optical images of printed planar $Ti_3C_2$ MXene geometries on alumina substrates encompassing different building-blocks, such as dots, straight lines, arcs, circles, and sharp corners. More complex planar patterns can be constructed based on these shapes. Specifically, FIG. 15*a* is an image of the printing of "Panat Lab Microelectronics Carnegie Melon University." FIG. 15*b* is an image of a brain-shaped circuit layout with letters "CMU" in the center. FIG. 15*c* is an image of the interdigitated circular spiral with radius of curvature and interline spacing of roughly 50 μm and roughly 55 μm, respectively. FIG. 15*d* is an image of a printed light-bulb shape. FIGS. 15*e* and 15*f* are images of a high-fidelity printing of the intricate Carnegie Mellon University logo on alumina substrate. The printed lines in FIG. 15*a*-15*f* are continuous and spatially uniform with sharp and even edges.

Figure 15A:
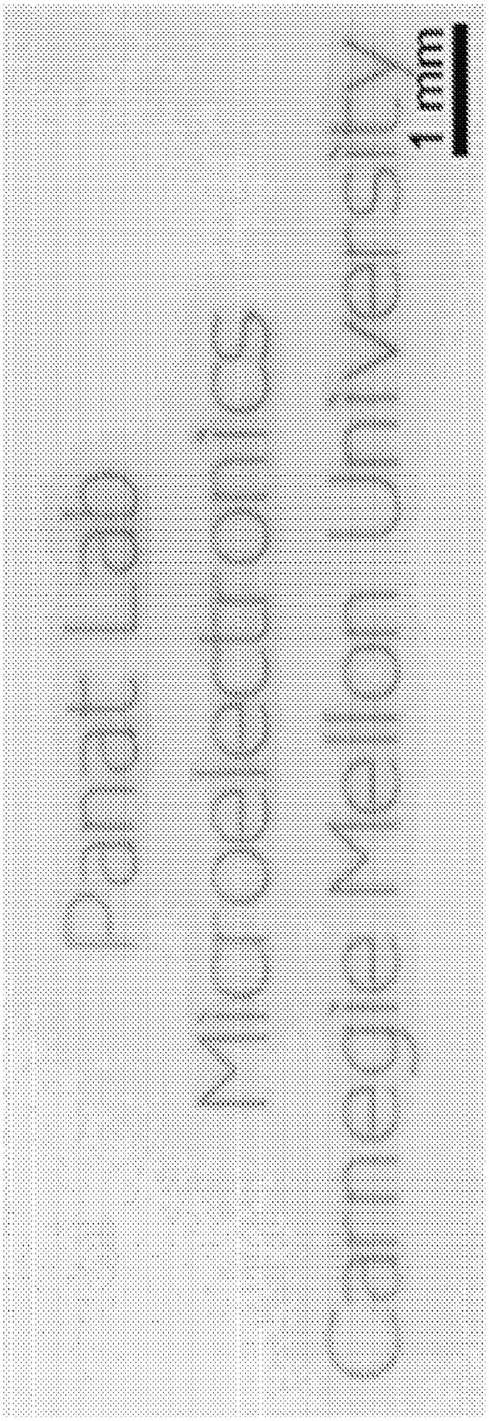
FIGS. 15*a*-15*e* are optical images of MXene printed on alumina substrates by aerosol jet printing, in accordance with some embodiments.
Figure 15B:
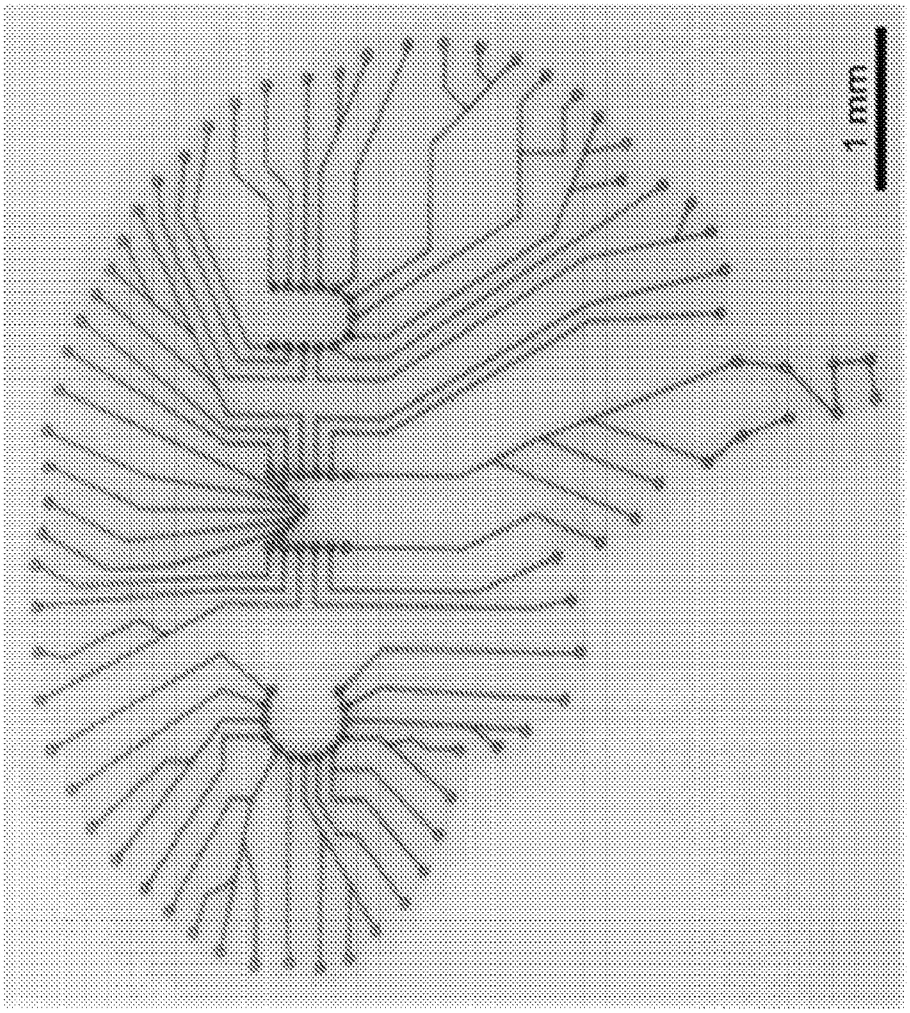
Figure 15C:
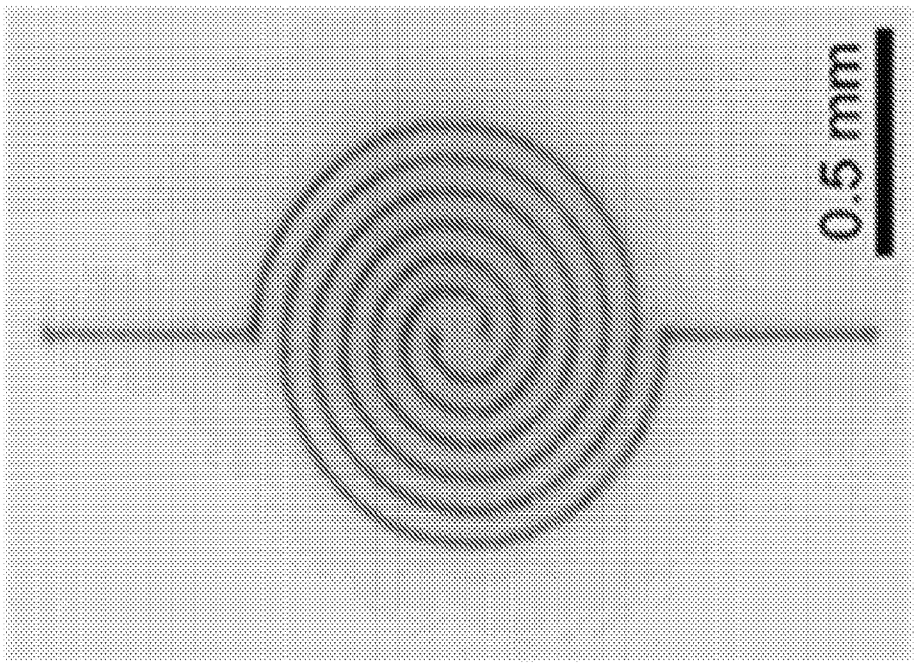
Figure 15D:
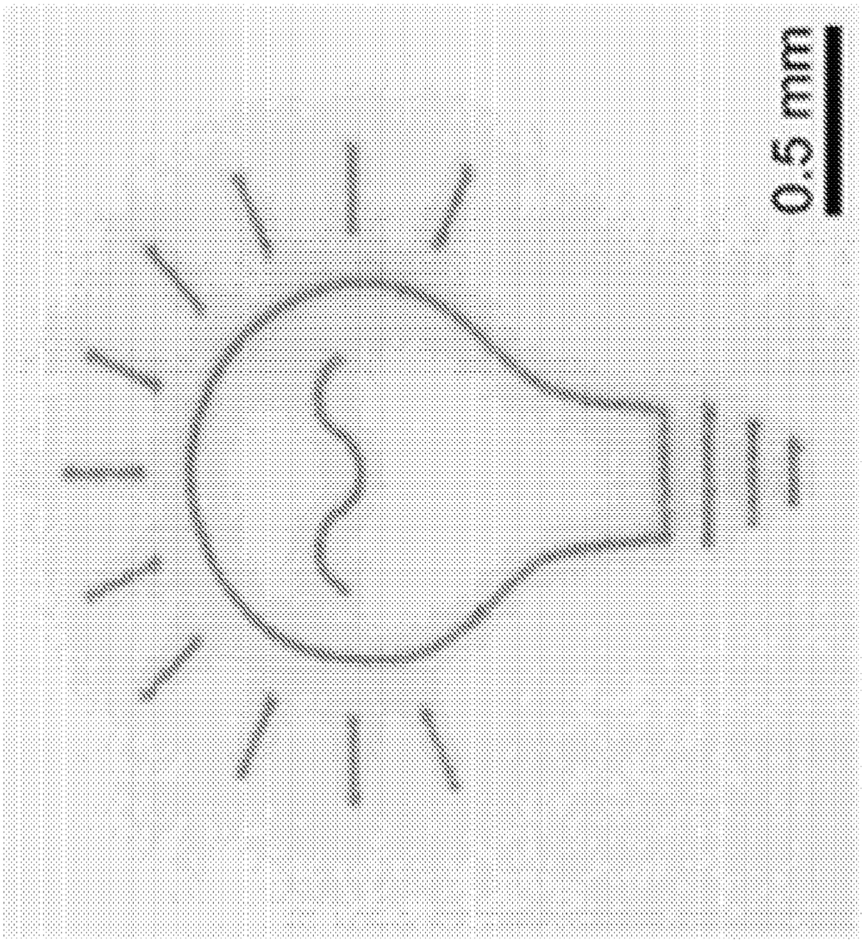
Figure 15E:
Figure 15F:
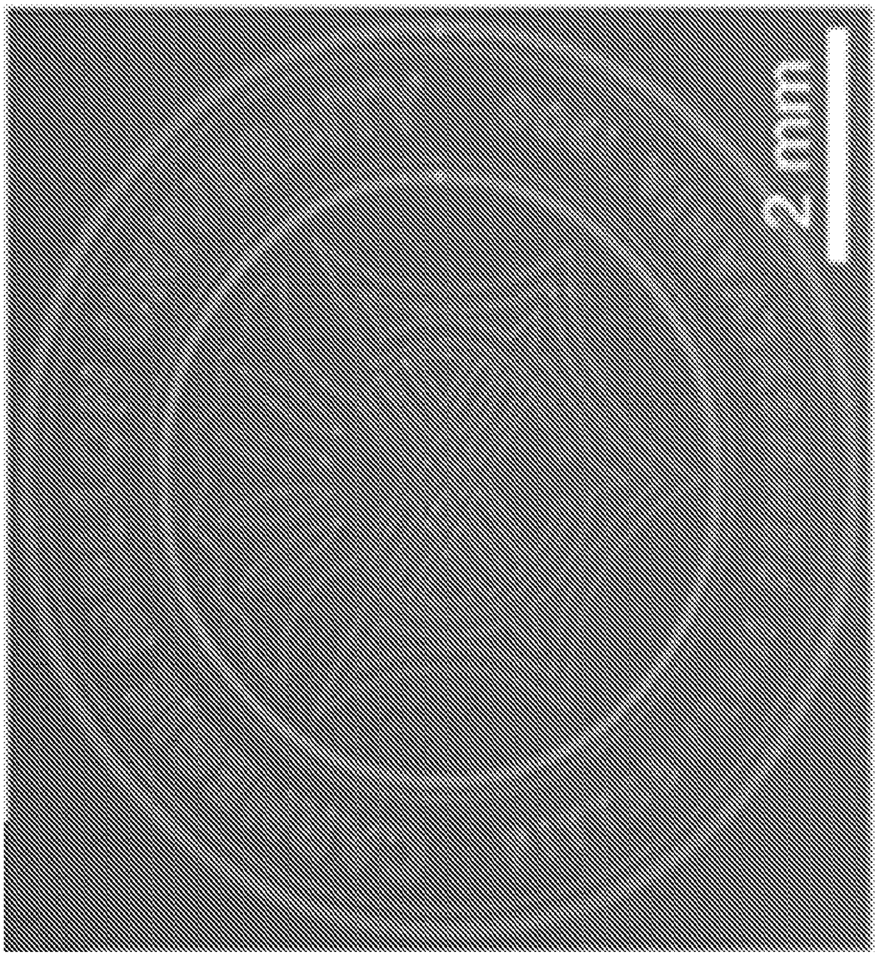
FIG. 15*f* is an SEM image of the printed image in 15*f*, in accordance with some embodiments.
Figure 15G:
FIG. 15*g* is an optical image of MXene printed on a Kapton substrate by aerosol jet printing, in accordance with some embodiments.

FIG. 15*g* is an image of the intricate Carnegie Mellon University logo on a Kapton substrate. In some embodiments, the printed lines in FIG. 15*g* have an ultrahigh feature resolution of roughly 24 μm. This printing resolution far exceeds those state-of-the-art techniques reported for e-jet printing at roughly 180 μm, inkjet printing at roughly 80 μm, screen printing at roughly 235 μm, and extrusion printing at roughly 438 μm.

Figure 15H:
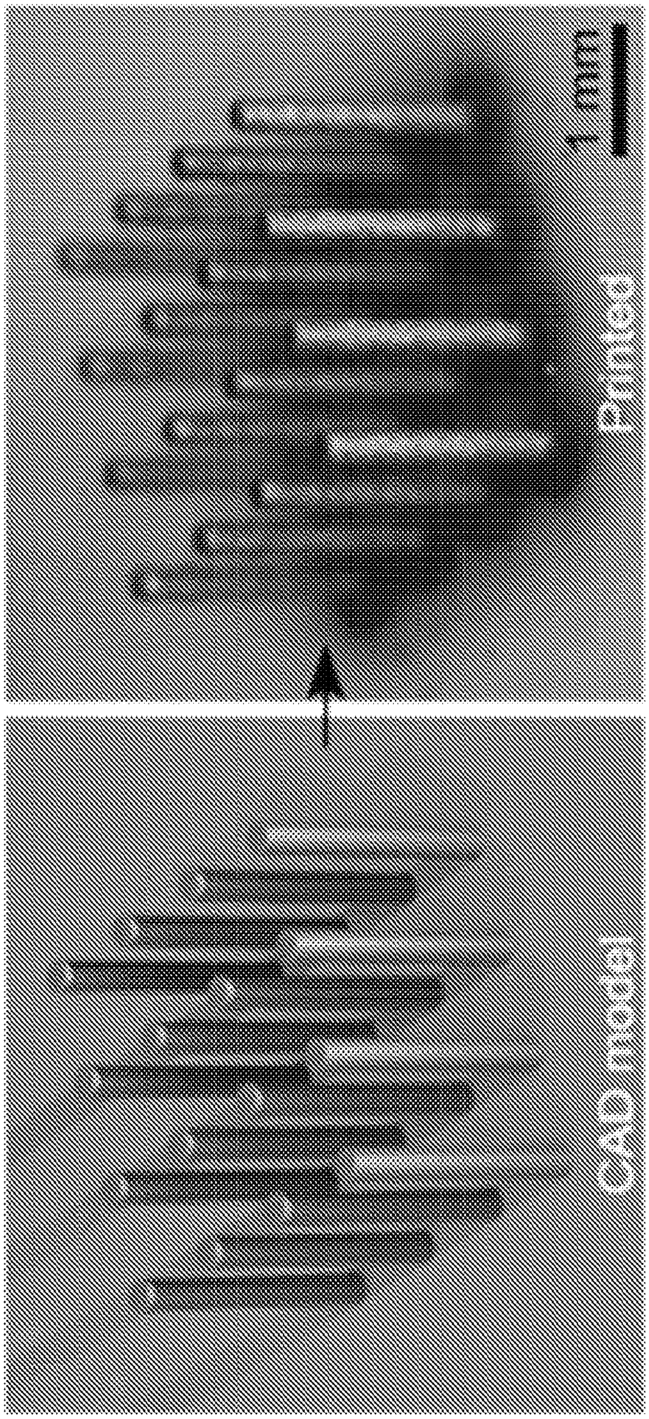
FIG. 15*h* is a CAD model and optical image of a micropillar array of MXene printed by aerosol jet printing, in accordance with some embodiments.
Figure 15I:
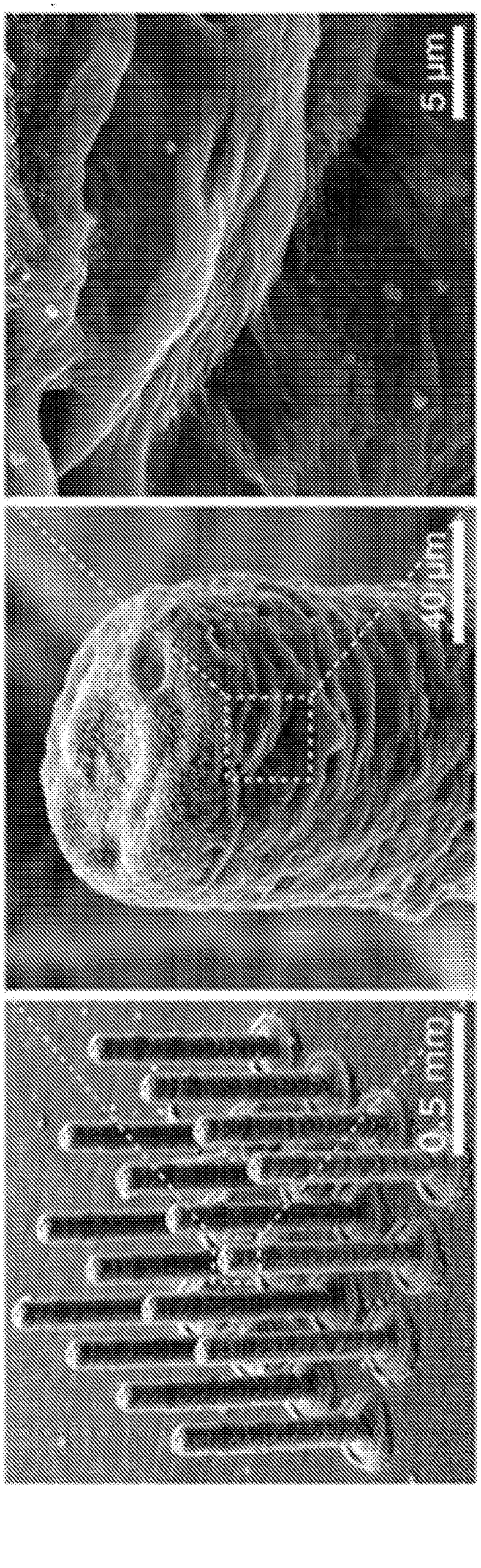
FIG. 15*i* depicts SEM images of the micropillar array of FIG. 15*i*, in accordance with some embodiments.

In some embodiments, aerosol jet 3D printing is used to fabricate additive-free 3D micropillar architectures of the $Ti_3C_2$ MXene nanosheets. FIG. 15*h* depicts a CAD model and an optical image of the MXene micropillars printed via the droplet-based aerosol jet printing method described earlier, in accordance with some embodiments. All the micropillars are straight in the optical image of FIG. 15*h*, as specified in the CAD model, with an axis within 0.5° to the vertical and a diameter uniformity of +2.3%. The characteristic wrinkled surface of the micro-pillars, shown in the SEM image in FIG. 15*i*, confirms the flaky nature of the interlinked building block, such as MXene in some embodiments, of the micro-pillars. The diameter and height of the pillars, roughly 100 μm and 1000 μm, respectively, give an aspect ratio of 10.

Figure 15J:
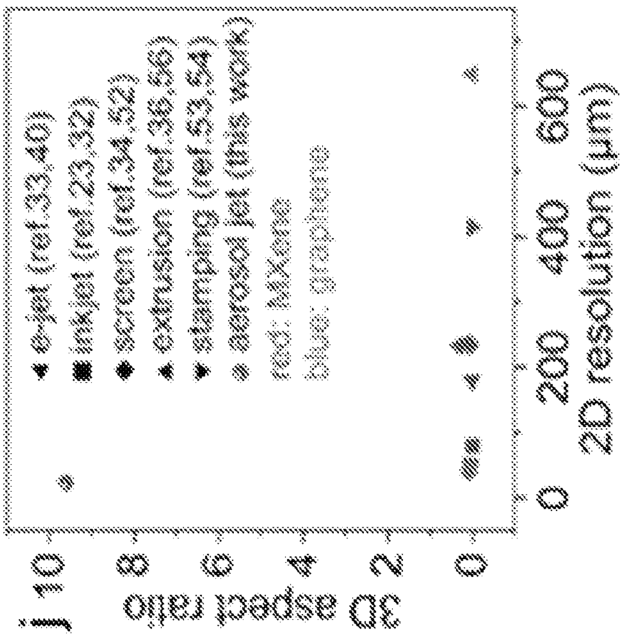
FIG. 15*j* is a graph depicting the performance of aerosol jet printing compared to other printing methods of MXene, in accordance with some embodiments.

Two of the most important figures of merit (FOM) for printing are the minimum feature size of 2D patterns (FOMf) and aspect ratio of 3D architectures (FOMa). Note that FOMa is the ratio of z-height, the direction out of the plane, of the structure to its typical x-y dimension, the direction in the plane. FIG. 15*j* is a graph depicting the FOMs for 2D materials obtained from literature in comparison to the FOM of embodiments of the present disclosure.

The FOMa of MXene and graphene microarchitectures created by e-jet printing, stamping, inkjet printing, and screen printing are less than 0.01, 0.02, 0.08, and 0.1, respectively. Regarding auxiliary-free extrusion printing, a slightly higher aspect ratio (~0.3) has been achieved at a cost of printing resolution for the extrusion printing of MXene. The aspect ratio of 10 thus far exceeds that in the literature and represents breaking of a barrier to the fabrication of additive-free 3D microarchitectures of 2D nanomaterials.

In some embodiments, the construction of 3D MXene structures using additive-free ink and the aerosol jet printing process is done in a single step without the need for the removal of additives and support materials. Furthermore, in some embodiments, the aerosol jet printing can be controlled by CAD programs.

Figure 16A:
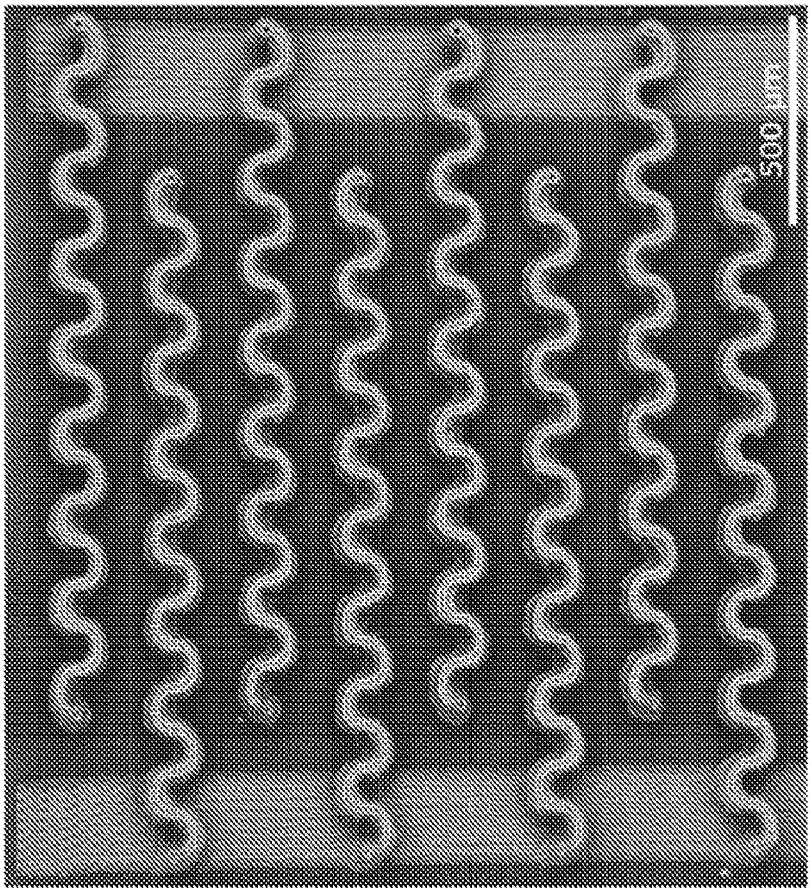
FIGS. 16*a*-16*e* are SEM images of aerosol jet printed 3D micro-supercapacitors under different magnifications, in accordance with some embodiments.
Figure 16B:
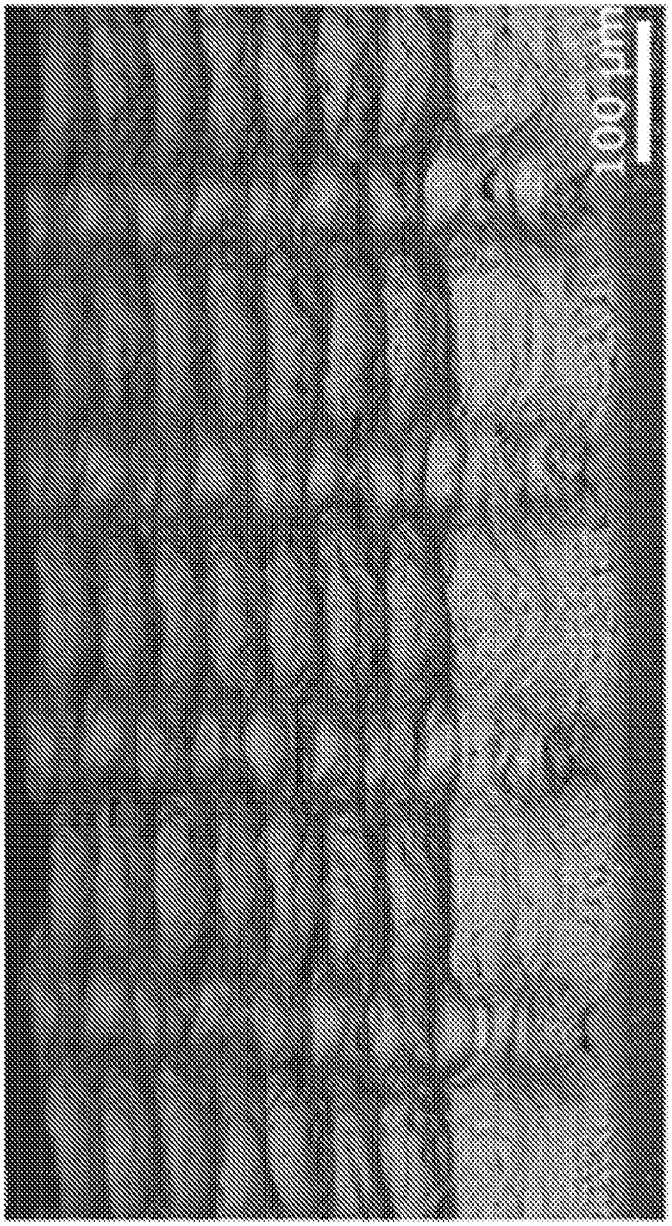
Figure 16C:
Figure 16D:

FIGS. 16*a*-16*d* are images depicting a MXene micro-supercapacitor with 3D interdigitated electrodes taken from different viewing angles and under varying magnifications, in accordance with some embodiments. As shown by FIG. 16*a*, in some embodiments, each electrode is well-defined, vertically straight, and isolated, illustrating the reliability of the aerosol jet printing process. The radius of the wavy shape, the curvature of the electrodes, is about 50 μm. The width of the electrode and the interspace distance between adjacent electrodes are about 24 μm and 120 μm, respectively. The realization of the electrode width and interspacing dimensions is owing to the high printing resolution and is beneficial to the kinetic performance of the micro-supercapacitors. FIG. 16*c* and FIG. 16*d* are images showing that the surfaces of the electrodes exhibit a wrinkled morphology in some embodiments.

Figure 16E:
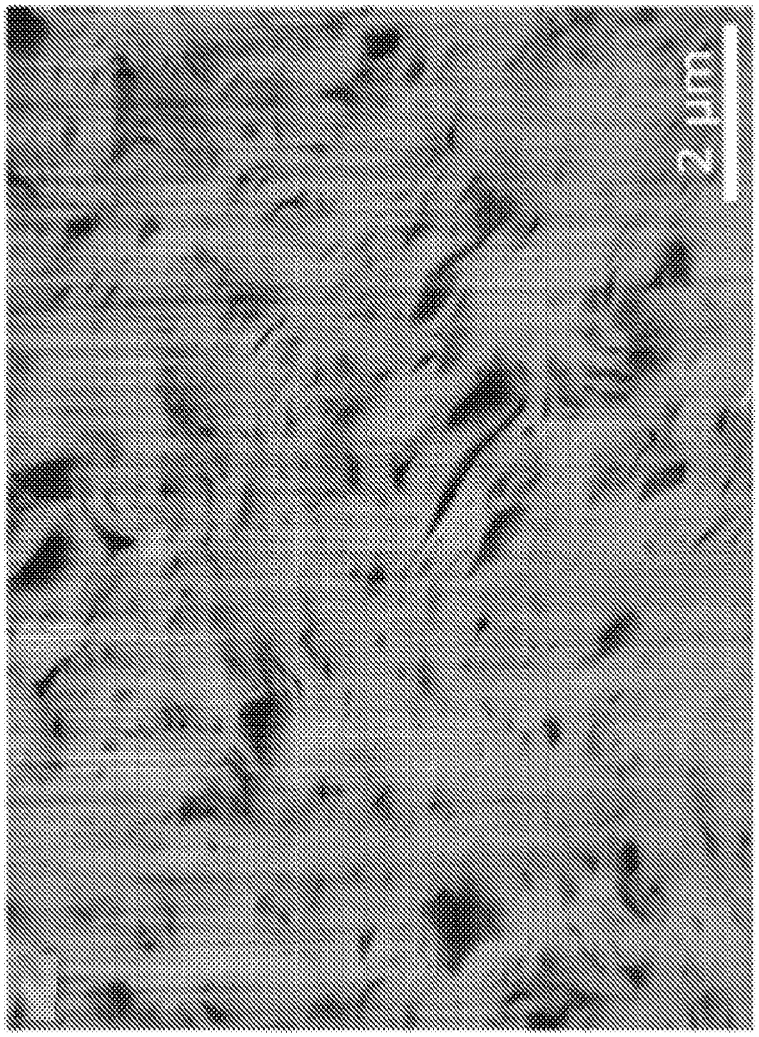

FIG. 16*e* is an SEM image of the internal microstructure of the electrode as it is exposed by focused ion beam milling, illustrating that the MXene nanosheets are interconnected and aligned with each other as well as the substrate to some extent in some embodiments. FIG. 16*e* also shows that there are randomly shaped microvoids with varying sizes less than 1 μm arbitrarily distributed throughout the electrode. The microvoids could favor efficient infiltration of electrolyte into the interior of the electrodes to improve the energy density and rate capability of the micro-supercapacitors depending upon the electrolyte density and capillary absorption dynamics in some embodiments.

Figure 16F:
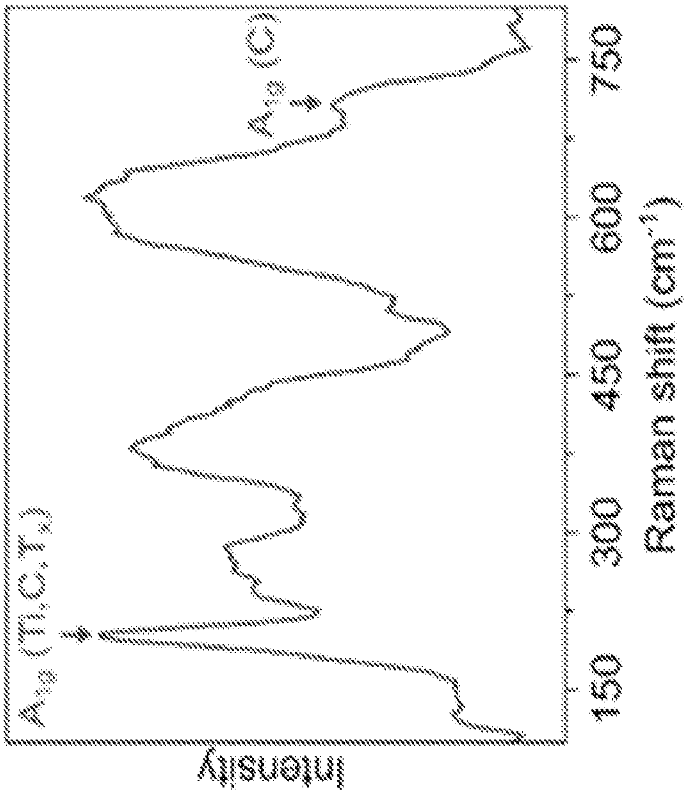
FIG. 16*f* is a graph of a Raman spectrum depicting the representative peaks of MXene, in accordance with some embodiments.

FIG. 16*f* is a graph illustrating that the MXene flakes were not modified or degraded during the aerosol jet printing process by Raman spectroscopy, in accordance with some embodiments.

FIG. 17 shows the electrochemical performance of the interdigitated $Ti_3C_2$ MXene micro-supercapacitors fabricated via aerosol jet printing shown in FIG. 16*a*, in accordance with some embodiments. Specifically, 17a shows the normalized cyclic voltammetry curves of a micro-supercapacitor over the potential window of 0-0.5 V at scan rates from 5 to 200 $mV\cdot s^{-1}$. The typical quasi-rectangular shaped cyclic voltammetry curves with rapid current response and no distinct peaks indicate an ideal capacitive charge storage behavior, suggesting fast charge transfer within the electrode and rapid charge intercalation/de-intercalation between the MXene basal planes with good reversibility. This suggests that the assembled MSCs have good rate performance, consistent with the microvoid-containing electrodes with fine features.

Figure 17A:
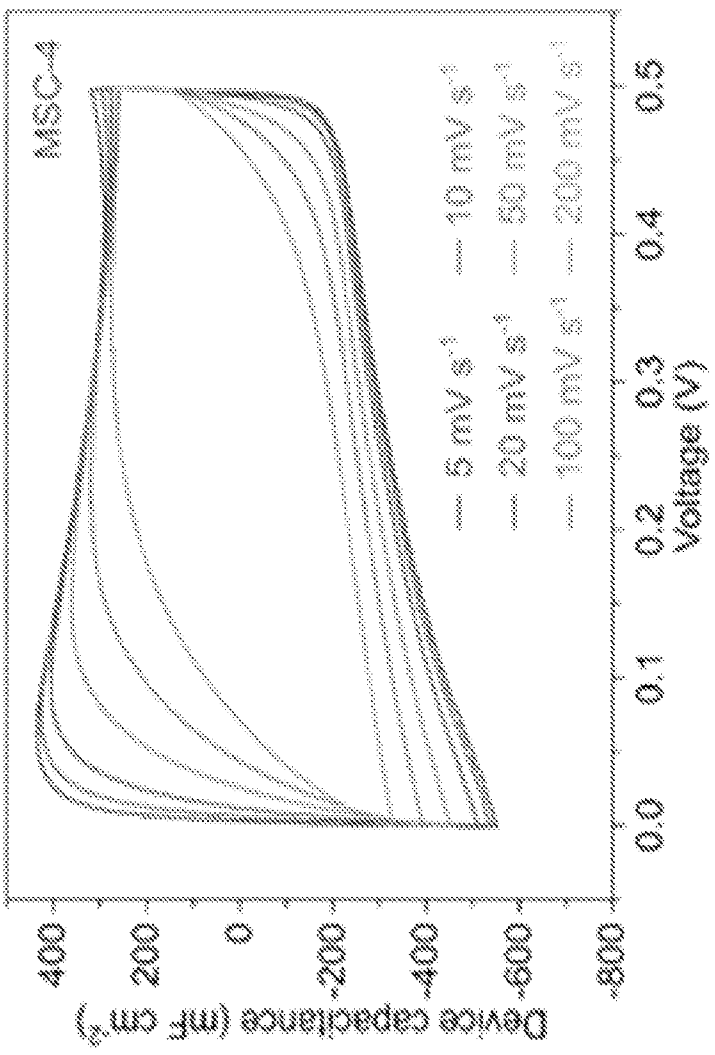
FIG. 17*a* is a graph of normalized cyclic voltammetry curves of a 3D micro-supercapacitor at various scan rates, in accordance with some embodiments.
Figure 17B:
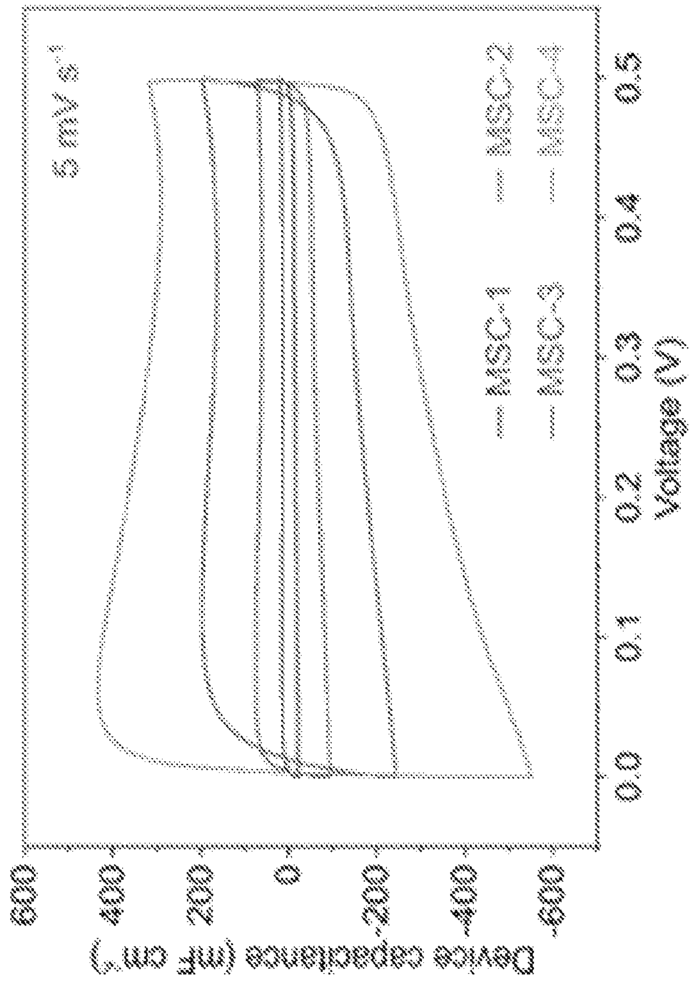
FIG. 17*b* a graph of normalized cyclic voltammetry curves of 3D micro-supercapacitors with varying electrode heights, in accordance with some embodiments.

FIG. 17*b* is a graph depicting the normalized cyclic voltammetry curves of four micro-supercapacitor with varying electrode height at a scan rate of 5 $mV\cdot s^{-1}$, in accordance with some embodiments. It demonstrates that even at different heights, the cyclic voltammetry curves have similar shapes.

Figure 17C:
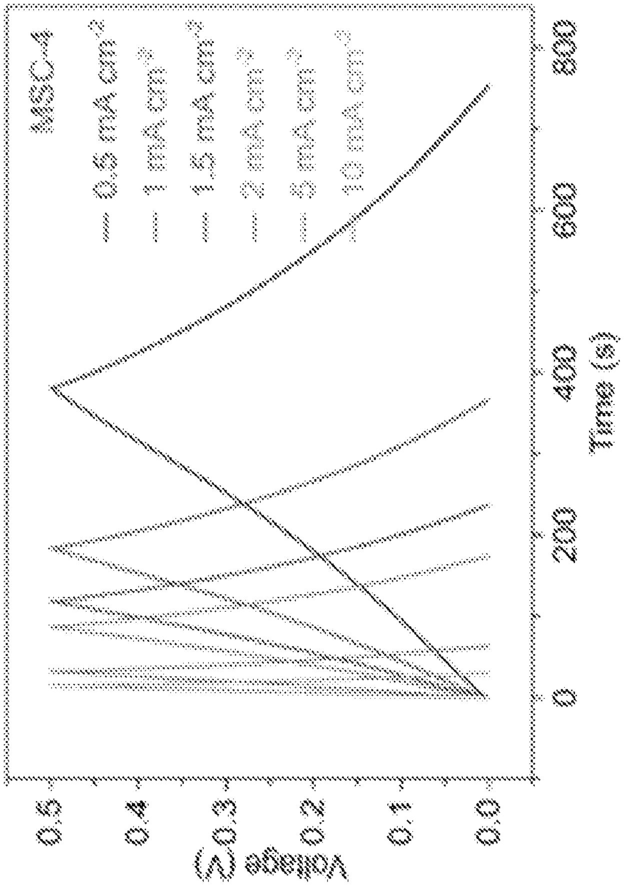
FIG. 17*c* is a graph of the galvanostatic charge/discharge profiles of a 3D micro-supercapacitor at various current densities, in accordance with some embodiments.
Figure 17D:
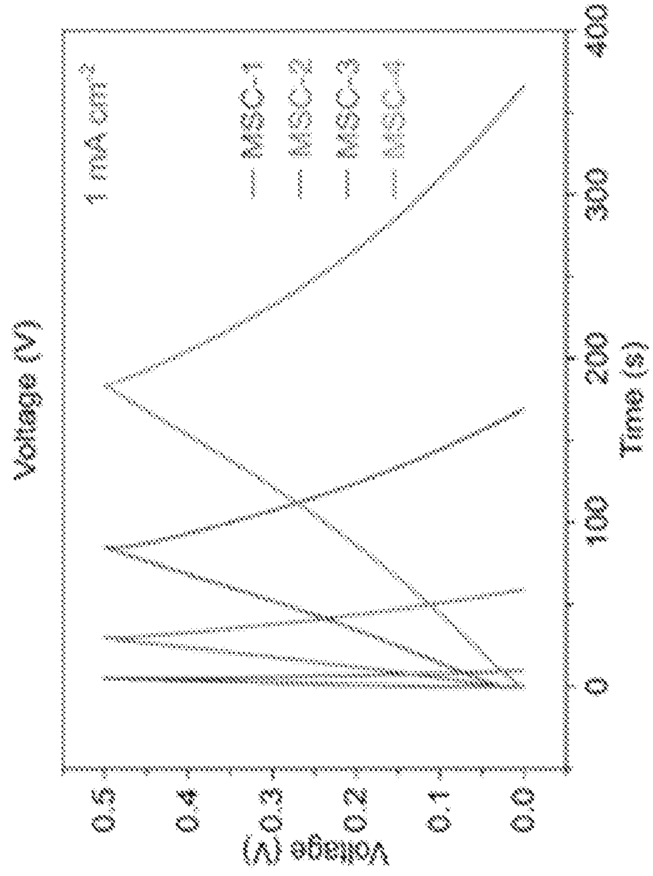
FIG. 17*d* is a graph of the galvanostatic charge/discharge profiles of 3D micro-supercapacitors with varying electrode heights, in accordance with some embodiments.

FIG. 17*c* is a graph depicting the galvanostatic charge/discharge profiles of the same micro-supercapacitor as FIG. 17*a* at various current densities, in accordance with some embodiments. FIG. 17*d* is a graph depicting the galvanostatic charge/discharge profiles of different micro-supercapacitors at varying electrode height at a current density of 1 $mA\cdot cm^{-2}$. The isosceles triangular shape of the galvanostatic charge/discharge curves with nearly linear potential-time relationship reveals the micro-supercapacitors possess excellent capacitive characteristics, power performance, as well as reversibility of the charge/discharge process, in good alignment with the results obtained from the CV curves. It can be seen from FIG. 17*d* that at the same current density, micro-supercapacitors with a greater electrode height have a longer charge/discharge duration and thus higher areal capacitance, agreeing with FIG. 17*b*.

Figure 17E:
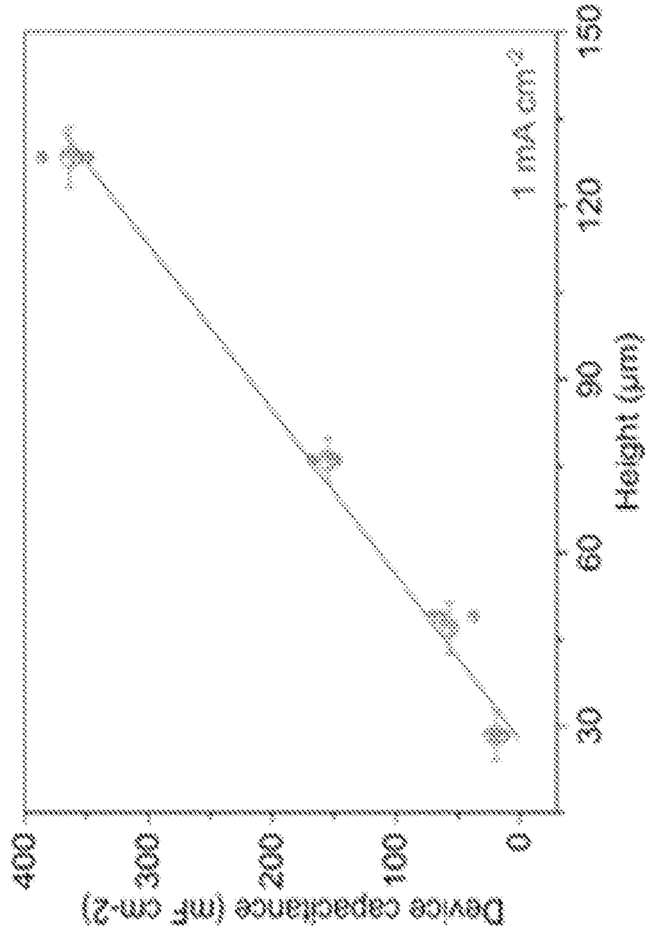
FIG. 17*e* is a graph of device capacitance of 3D micro-supercapacitors, in accordance with some embodiments.

FIG. 17*e* is a graph depicting the device capacitance of the MXene micro-supercapacitors at varying heights under a current density of 1 $mA\cdot cm^{-2}$, in accordance with some embodiments. The linear filling curve shows that the capacitance scales linearly with the electrode height, which is ascribed to the fact that areal loading of the active electrode material is proportional to the height of the electrode and that well-engineered electrode structure makes the surface of the MXene highly accessible to the electrolyte.

Figure 17F:
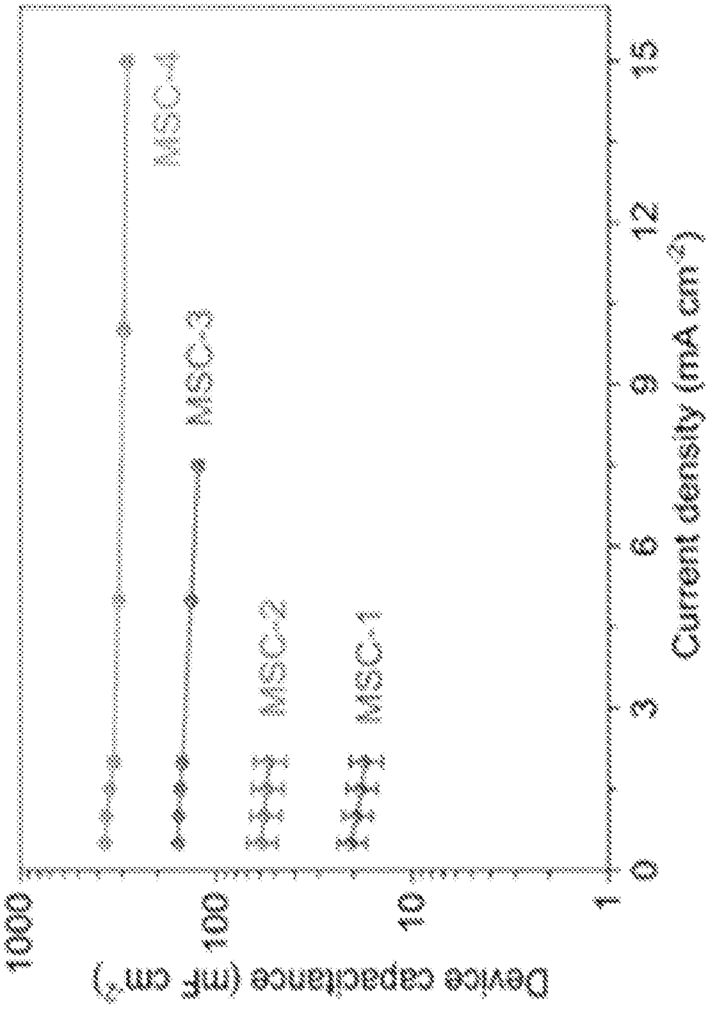
FIG. 17*f* is a graph of areal capacitance of 3D micro-supercapacitors, in accordance with some embodiments.

FIG. 17*f* is a graph depicting the areal capacitances of MXene micro-supercapacitors at varying heights as a function of current density, in accordance with some embodiments.

FIG. 18 shows the comparison of the electrochemical performance of the aerosol jet printed interdigitated 3D MXene micro-supercapacitors, in accordance with some embodiments in the present disclosure, to micro-supercapacitors created using other methods as well as the micro-supercapacitor cycling stability. FIG. 18*a* and FIG. 18*b* are graphs that compare interdigitated micro-supercapacitors fabricated by aerosol jet printing with micro-supercapacitors made by other high-resolution methods in terms of device capacitance. They depict that the areal capacitance of micro-supercapacitors fabricated with aerosol printing significantly outperforms that of those made by other techniques.

Figure 18A:
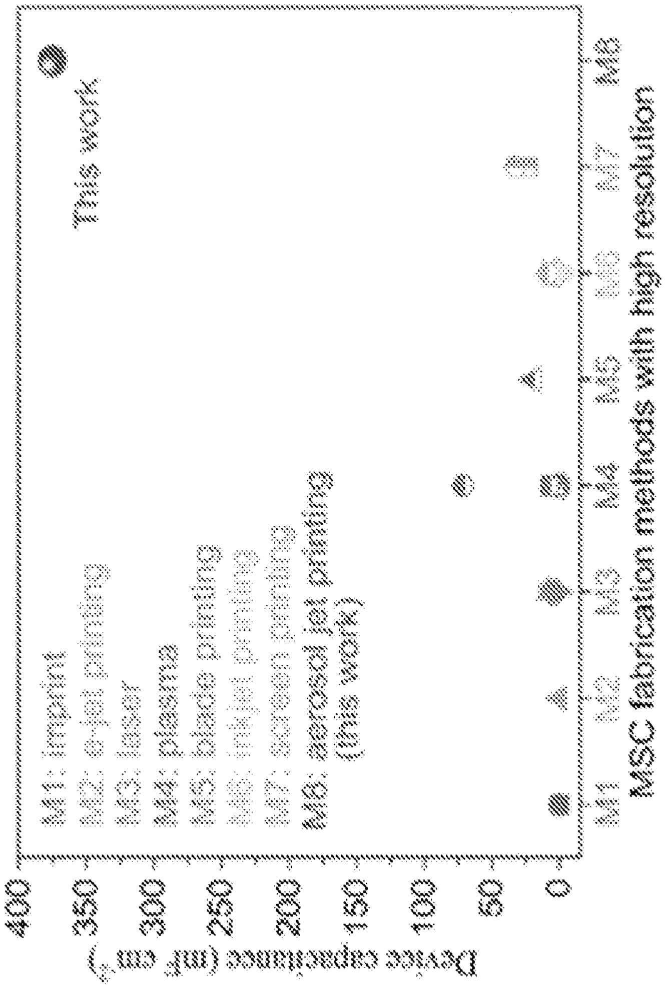
FIG. 18*a* is a graph depicting the comparison of 3D micro-supercapacitors fabricated via aerosol jet printing with micro-supercapacitors fabricated via other methods, in accordance with some embodiments.
Figure 18B:
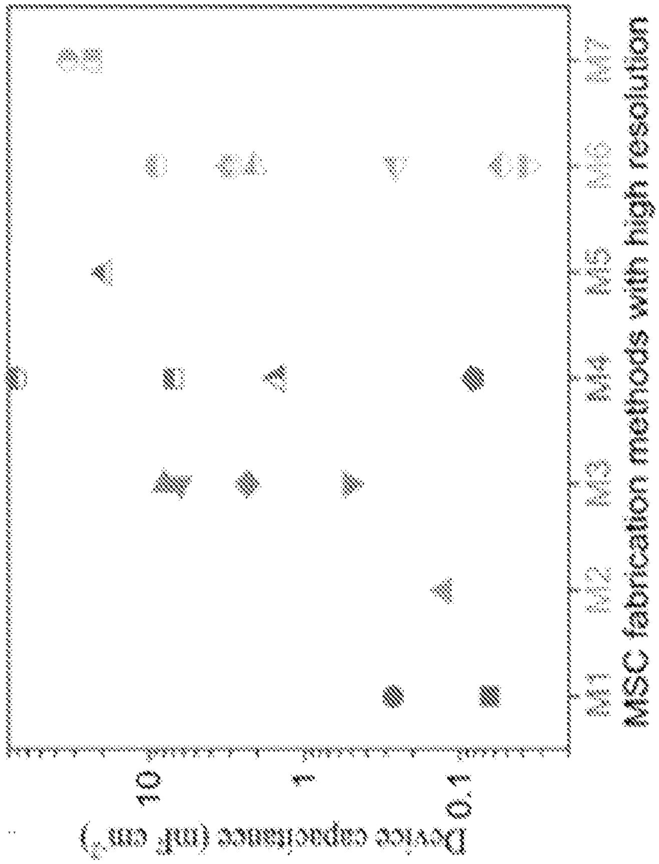
FIG. 18*b* is a magnified graph of FIG. 18*a*, in accordance with some embodiments.
Figure 18C:
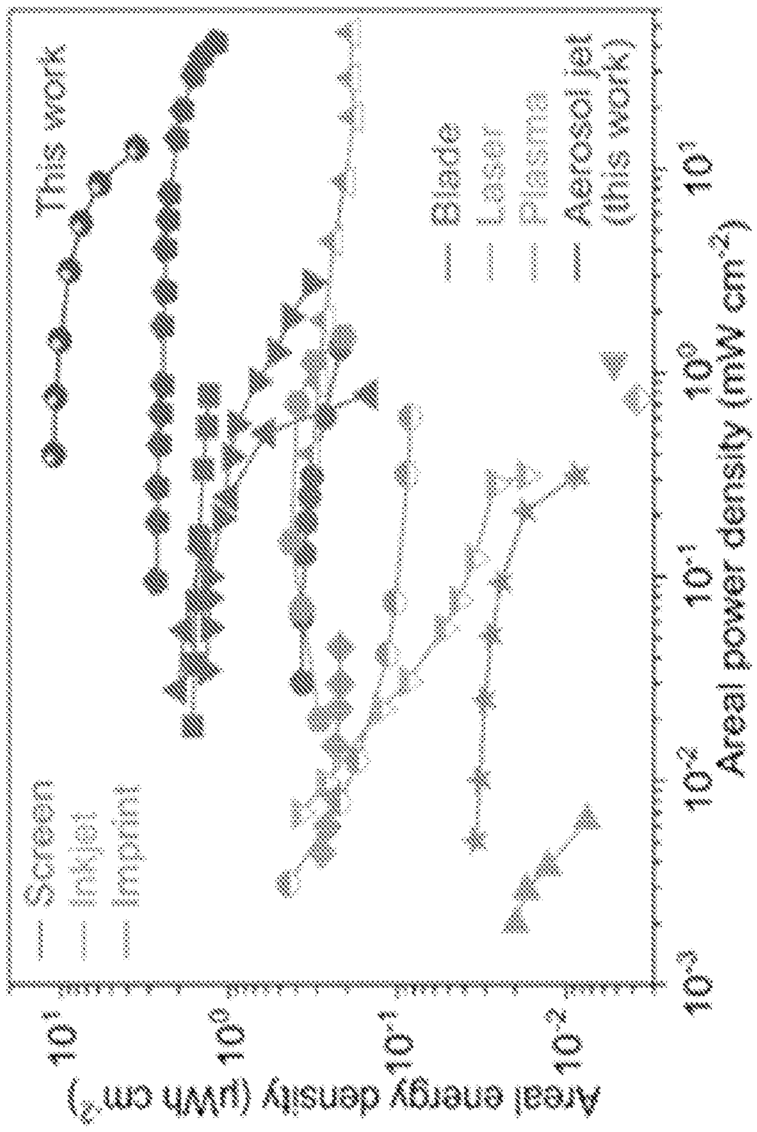
FIG. 18*c* is a ragone plot depicting the energy and power density of 3D micro-supercapacitors fabricated via aerosol jet printing and other methods, in accordance with some embodiments.
Figure 18D:
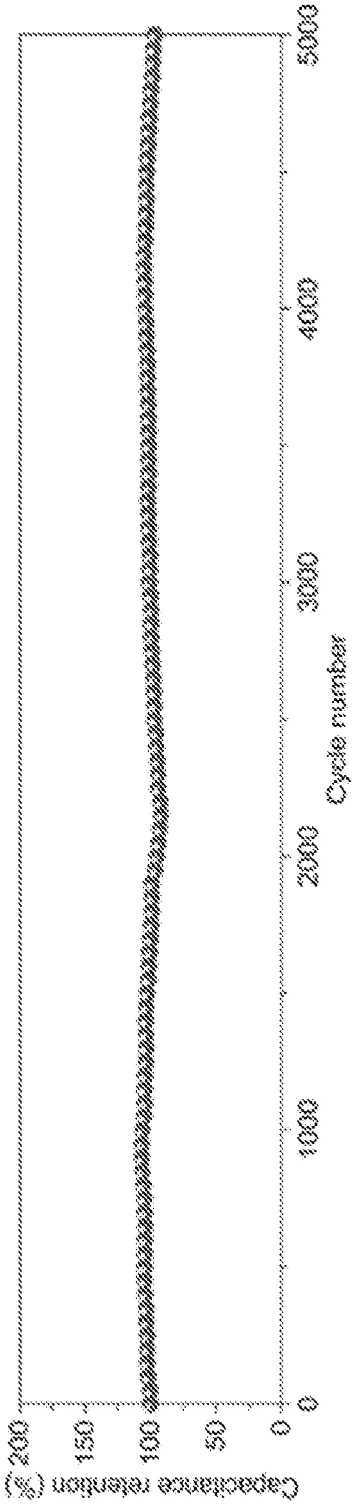
FIG. 18*d* is a graph depicting cycling performance of 3D micro-supercapacitors fabricated by aerosol jet printing, in accordance with some embodiments.
Figure 18E:
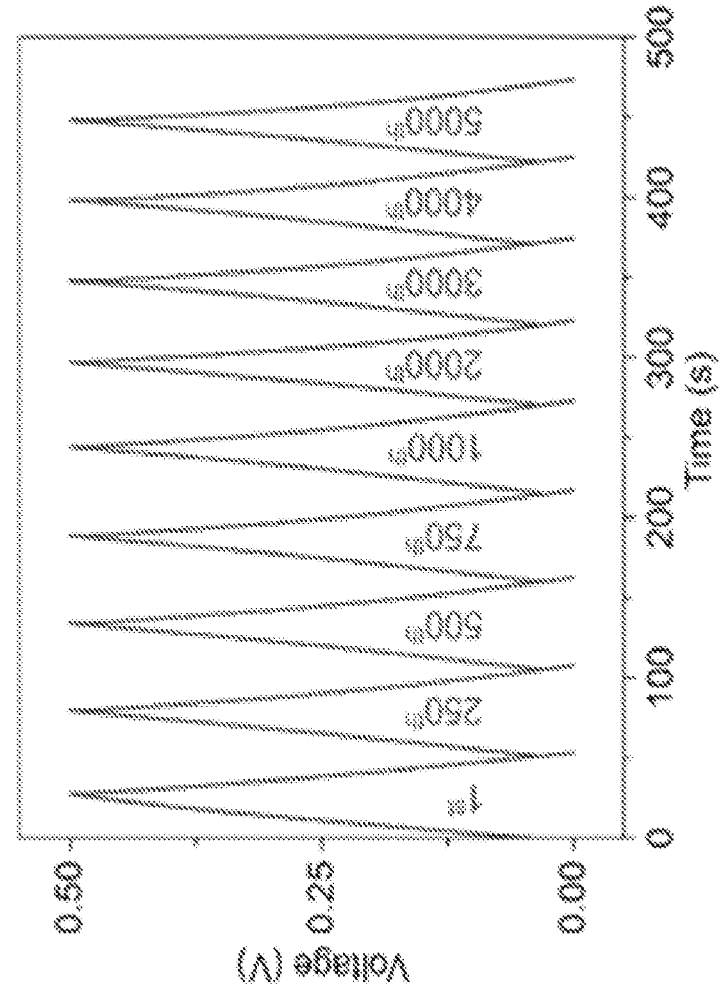
FIG. 18*e* is a graph of galvanostatic charge/discharge of 3D micro-supercapacitors, in accordance with some embodiments.

FIG. 18*c* is a graph that demonstrates the overall performance of additive free MXene micro-supercapacitors fabricated by aerosol printing, in accordance with some embodiments, and other high-resolution fabrication techniques. Based on FIG. 18*c*, micro-supercapacitors fabricated by aerosol printing's performance exceed that of micro-supercapacitors fabricated by imprinting, blade printing, laser scribing, plasma etching, inkjet printing, and screen printing. FIG. 18*d* is a graph illustrating that the capacitance retention is as high as 96.8% after 5,000 charge/discharge cycles at a current density of 5 $mA \cdot cm^{-2}$, in some embodiments. FIG. 18*e* is a graph that shows the isosceles triangular shape of the galvanostatic charge/discharge of micro-supercapacitors at different charge/discharge cycle numbers under a current density of 5 $mA \cdot cm^{-2}$, in accordance with some embodiments.

The present disclosure is directed to 3D printed micro-supercapacitors and methods for fabricating 3D printed micro-supercapacitors. An example of a micro-supercapacitor includes a three-dimensional electrode having a plurality of self-supporting layers of two-dimensional nanomaterial stacked in a vertical direction. The plurality of self-supporting layers define one or more shapes in a plane that is at an arbitrary angle to the vertical direction. The height in the vertical direction is at least five times greater than the minimum feature size of one or more shapes.

Another example of a micro-supercapacitor includes a three-dimensional electrode having a plurality of self-supporting layers of nanoparticle material stacked in a vertical direction. The plurality of self-supporting layers define one or more shapes in a plane that is at an arbitrary angle to the vertical direction. The height in the vertical direction is at least five times greater than the feature size of one or more shapes.

In an example method for forming a micro-supercapacitor a non-contract 3D printer generates a micro-supercapacitor. The micro-supercapacitor includes a three-dimensional electrode having a plurality of self-supporting layers of nanoparticle material stacked in a vertical direction. The plurality of self-supporting layers define one or more shapes in a plane that is at an arbitrary angle to the vertical direction. The height in the vertical direction is at least five times greater than the feature size of one or more shapes.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A micro-supercapacitor comprising:

a three-dimensional electrode having (i) a plurality of self-supporting layers of two-dimensional nanomaterial stacked in a vertical direction, the plurality of self-supporting layers defining one or more shapes in a plane that is at an arbitrary angle to the vertical direction, and (ii) a height in the vertical direction that is at least 10 times greater than the minimum feature size of the one or more shapes, wherein the minimum feature size of the one or more shapes in a plane perpendicular to the vertical direction is between 2 and 50 micrometers.

2. The micro-supercapacitor of claim 1, wherein the two-dimensional nanomaterial comprises additive-free $Ti_3C_2$ MXene nanosheets.

3. The micro-supercapacitor of claim 1 comprising a plurality of the three-dimensional electrodes spaced apart from each other by a distance.

4. The micro-supercapacitor of claim 3, wherein the distance is between 2 and 250 micrometers.

5. The micro-supercapacitor of claim 3, wherein the plurality of three-dimensional electrodes comprises wavy walls in an interdigitated configuration.

6. The micro-supercapacitor of claim 3, wherein the plurality of three-dimensional electrodes comprise straight walls in an interdigitated configuration.

7. The micro-supercapacitor of claim 3, further comprising:

a base layer perpendicular to the vertical direction that electrically connects the plurality of three-dimensional electrodes.

8. The micro-supercapacitor of claim 1 comprising a plurality of the three-dimensional electrodes arbitrarily interwoven between each other but electrically isolated from each other.

9. The micro-supercapacitor of claim 8, wherein the plurality of three-dimensional electrodes comprise arbitrary shapes with overhang structures.

10. The micro-supercapacitor of claim 8, wherein the plurality of three-dimensional electrodes comprise arbitrary shapes with electrical isolation between electrodes via three-dimensional overhang structures or printing of an insulating structure.

11. The micro-supercapacitor of claim 1, further comprising an electrolyte formed over the three-dimensional electrode.

12. The micro-supercapacitor of claim 11, wherein the electrolyte is a gel electrolyte, an aqueous electrolyte, an organic electrolyte, or an ionic liquid electrolyte.

13. The micro-supercapacitor of claim 1, wherein the three-dimensional electrode includes active electrode material and does not include current collector material.

14. The micro-supercapacitor of claim 1, wherein the three-dimensional electrode comprises current collector material and active electrode material stacked in an alternating manner in the vertical direction.

15. The micro-supercapacitor of claim 1, wherein the two-dimensional nanomaterial comprises MXene or graphene.

16. The micro-supercapacitor of claim 1, wherein the self-supporting layers define overhang features without support structures.

17. The micro-supercapacitor of claim 1, wherein the one or more shapes include a wavy shape.

18. The micro-supercapacitor of claim 1, wherein the one or more shapes comprise an aspect ratio of 30:1.

19. A micro-supercapacitor comprising:

a three-dimensional electrode having (i) a plurality of self-supporting layers of two-dimensional nanoparticle material stacked in a vertical direction, the plurality of self-supporting layers defining one or more shapes in a plane that is at an arbitrary angle to the vertical direction, and (ii) a height in the vertical direction that is at least 10 times greater than a minimum feature size of the one or more shapes, wherein the minimum feature size of the one or more shapes in a plane perpendicular to the vertical direction is between 2 and 50 micrometers, and wherein the self-supporting layers define overhang features without support structures.

20. The micro-supercapacitor of claim 19, wherein the two-dimensional nanoparticle material comprises silver, gold, or platinum.

21. A method of forming a micro-supercapacitor comprising:

using non-contact 3D printing to generate a micro-supercapacitor including a three-dimensional electrode having (i) a plurality of self-supporting layers of two-dimensional nanomaterial stacked in a vertical direction, the plurality of self-supporting layers defining one or more shapes in a plane that is at an arbitrary angle to the vertical direction, and (ii) a height in the vertical direction that is at least 10 times greater than a minimum feature size of the one or more shapes, wherein the minimum feature size of the one or more shapes in a plane perpendicular to the vertical direction is between 2 and 50 micrometers.

22. The method of claim 21, wherein the non-contact 3D printing is aerosol jet 3D printing.

23. The method of claim 21, wherein using the non-contact 3D printing to generate the micro-supercapacitor comprises:

forming a printing ink including nanoparticles suspended in a solvent;

dispensing the printing ink to deposit a layer of the two-dimensional nanomaterial; and using heat or another form of energy to remove the solvent from the deposited layer.

24. The method of claim 23, wherein dispensing the printing ink comprises:

atomizing the printing ink to create droplets forming an aerosol; and jetting the aerosol out of a nozzle to deposit the layer of the two-dimensional nanomaterial in three-dimensional space without support structures.

25. The method of claim 24, further comprising:

using an inert carrier gas to transport the aerosol to a printhead where the aerosol is focused by a sheath gas for jetting from the nozzle.

26. The method of claim 24, wherein each of the droplets carries MXene nanosheets.

* * * * *